(12) United States Patent
Scholl et al.

(10) Patent No.: US 11,288,733 B2
(45) Date of Patent: Mar. 29, 2022

(54) INTERACTIVE 3D IMAGE PROJECTION SYSTEMS AND METHODS

(71) Applicant: MASTERCARD INTERNATIONAL INCORPORATED, Purchase, NY (US)

(72) Inventors: Christopher T. Scholl, Saint Peters, MO (US); James W. Barkhurst, Fenton, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/191,072

(22) Filed: Nov. 14, 2018

(65) Prior Publication Data
US 2020/0151805 A1 May 14, 2020

(51) Int. Cl.
*G06Q 30/06* (2012.01)
*G06T 19/00* (2011.01)
(Continued)

(52) U.S. Cl.
CPC ....... *G06Q 30/0643* (2013.01); *G06F 3/0482* (2013.01); *G06F 3/04815* (2013.01); *G06Q 30/0633* (2013.01); *G06T 19/006* (2013.01); *G06K 19/06037* (2013.01); *G06T 2200/24* (2013.01)

(58) Field of Classification Search
CPC .............. G06Q 30/06; G06Q 30/0601; G06Q 30/0603; G06Q 30/0633; G06Q 30/0641; G06Q 30/0643; G06T 13/00; G06T 13/40; G06T 15/00; G06T 15/08; G06T 17/00; G06T 17/05; G06T 19/00; G06T 19/003; G06T 19/0006; G06T 2200/04; G06T 2200/08; G06T 2200/24; G06T 19/006; G06F 3/04815; G06F 3/0481; G06F 9/048; G06F 3/0482; G06K 19/06037
See application file for complete search history.

(56) References Cited

U.S. PATENT DOCUMENTS 6,915,279 B2 * 7/2005 Hogan .................... G06Q 20/02
705/39
7,643,025 B2 * 1/2010 Lange .................... G02B 27/22
345/419
(Continued)

*Primary Examiner* — Charles L Beard
(74) *Attorney, Agent, or Firm* — Armstrong Teasdale LLP

(57) ABSTRACT

A 3D interface generator computing device ("3D device") is provided. The 3D device includes at least one sensor, a projector, and a memory that stores (i) a 3D image including 3D elements, (ii) identification for individuals, each associated with an element, and (iii) list data associated with an individual and purchase options. The 3D device includes at least one processor coupled to the memory, the projector, and the sensor. The processor is configured to project the 3D image into a real-world space. The 3D device also receives a first interaction with a 3D element, retrieves the individual associated with the 3D element and a set of list data associated with the individual. The 3D device overlays purchase option images onto the 3D image, each representing an option in the list data, receives a second interaction with a purchase option image, and generates a purchase transaction request for the purchase option.

20 Claims, 9 Drawing Sheets

(51) Int. Cl.
   *G06F 3/0482*   (2013.01)
   *G06F 3/04815*  (2022.01)
   *G06K 19/06*    (2006.01)

(56) References Cited

U.S. PATENT DOCUMENTS

| | | | |
|---|---|---|---|
| 7,792,801 B2* | 9/2010 | Hamilton, II | G06Q 30/0627 707/655 |
| 8,229,800 B2* | 7/2012 | Trotman | G06Q 30/02 705/26.1 |
| 8,549,001 B1* | 10/2013 | Minevski | G06F 16/955 707/736 |
| 8,564,595 B1* | 10/2013 | Ho | A63F 13/00 345/426 |
| 8,606,645 B1* | 12/2013 | Applefeld | G06T 19/006 705/14.25 |
| 8,704,879 B1* | 4/2014 | Cheng | G06F 3/013 348/51 |
| 8,847,919 B2* | 9/2014 | Krah | G02B 27/2292 345/173 |
| 8,896,685 B2* | 11/2014 | Ihara | G01C 21/3407 348/116 |
| 8,923,686 B2* | 12/2014 | Krishnaswamy | H04N 13/156 386/326 |
| 9,098,873 B2* | 8/2015 | Geisner | G06Q 30/02 |
| 9,129,433 B1 | 9/2015 | Korobkin | |
| 9,298,266 B2 | 3/2016 | Blackstone et al. | |
| 9,520,072 B2* | 12/2016 | Sun | G06T 19/006 |
| 9,547,938 B2* | 1/2017 | Ramkumar | G06F 15/16 |
| 9,565,400 B1* | 2/2017 | Curlander | H04N 7/181 |
| 9,595,115 B1* | 3/2017 | Cederlof | G06F 3/011 |
| 9,606,584 B1* | 3/2017 | Fram | G06F 1/1694 |
| 9,641,823 B2 | 5/2017 | Said et al. | |
| 9,721,383 B1* | 8/2017 | Horowitz | G06K 9/00355 |
| 9,728,007 B2* | 8/2017 | Hakkarainen | H04N 5/23293 |
| 9,734,634 B1* | 8/2017 | Mott | G06T 19/006 |
| 9,762,757 B2* | 9/2017 | Kim | H04N 1/00307 |
| 9,767,613 B1* | 9/2017 | Bedikian | G06F 3/04845 |
| 9,785,247 B1* | 10/2017 | Horowitz | G06T 7/20 |
| 9,785,640 B2* | 10/2017 | Bailey | G06T 19/006 |
| 9,892,564 B1* | 2/2018 | Cvetko | A61B 5/0015 |
| 10,007,948 B1* | 6/2018 | Nickerson | G06Q 20/4014 |
| 10,009,640 B1* | 6/2018 | Lodato | H04N 21/236 |
| 10,052,026 B1* | 8/2018 | Tran | G06T 15/20 |
| 10,096,168 B2* | 10/2018 | Da Veiga | G02B 27/0172 |
| 10,122,969 B1* | 11/2018 | Lim | G06T 7/11 |
| 10,134,082 B2* | 11/2018 | Benkar | G06Q 30/0643 |
| 10,257,490 B2* | 4/2019 | Khalid | H04N 5/232 |
| 10,264,215 B1* | 4/2019 | Sadanand | G06Q 20/02 |
| 10,268,277 B2* | 4/2019 | Kang | G06F 3/04815 |
| 10,332,176 B2* | 6/2019 | Gadre | G06Q 30/0623 |
| 10,339,548 B1* | 7/2019 | Kumar | G06Q 30/0205 |
| 10,339,721 B1* | 7/2019 | Dascola | H04M 1/72522 |
| 10,373,383 B1* | 8/2019 | Werner | G06F 3/04815 |
| 10,403,050 B1* | 9/2019 | Beall | G02B 27/017 |
| 10,445,716 B1* | 10/2019 | Riechers | G06Q 20/355 |
| 10,467,811 B1* | 11/2019 | Cederlof | G06F 3/011 |
| 10,482,664 B1* | 11/2019 | Schlosser | G06Q 20/3278 |
| 10,504,297 B2* | 12/2019 | Cuthbertson | G06T 19/006 |
| 10,515,397 B2* | 12/2019 | Serfass | G06T 17/00 |
| 10,559,019 B1* | 2/2020 | Beauvais | G06T 19/006 |
| 10,614,616 B1* | 4/2020 | Tedesco | G06F 3/017 |
| 10,635,895 B2* | 4/2020 | Andersen | G06K 9/6274 |
| 10,692,299 B2* | 6/2020 | Bhushan | G06F 3/017 |
| 10,699,488 B1* | 6/2020 | Terrano | G06N 20/00 |
| 10,706,584 B1* | 7/2020 | Ye | G06K 9/3241 |
| 10,712,901 B2* | 7/2020 | Hwang | G06F 3/1423 |
| 10,755,487 B1* | 8/2020 | Snibbe | G06T 19/006 |
| 10,783,554 B1* | 9/2020 | Hylton | G06Q 30/0259 |
| 10,783,712 B2* | 9/2020 | Hwang | G06F 3/167 |
| 10,796,489 B1* | 10/2020 | Cordes | G06F 3/011 |
| 10,798,292 B1* | 10/2020 | Lei | G03B 13/36 |
| 10,853,869 B2* | 12/2020 | DeStefano | G06Q 30/0633 |
| 10,970,707 B1* | 4/2021 | Techel | G06Q 20/34 |
| 11,087,543 B1* | 8/2021 | Cowburn | H04L 67/16 |
| 2003/0018579 A1* | 1/2003 | Litster | G06Q 20/102 705/40 |
| 2003/0071810 A1* | 4/2003 | Shoov | G06F 30/00 345/420 |
| 2003/0187747 A1* | 10/2003 | Fukasawa | G06Q 30/0643 705/2 |
| 2004/0103038 A1 | 5/2004 | Power et al. | |
| 2005/0008256 A1* | 1/2005 | Uchiyama | G06T 7/80 382/291 |
| 2005/0081161 A1* | 4/2005 | MacInnes | G06T 19/20 715/765 |
| 2005/0195157 A1* | 9/2005 | Kramer | H04N 13/161 345/156 |
| 2005/0198571 A1* | 9/2005 | Kramer | H04N 13/161 715/236 |
| 2006/0038814 A1* | 2/2006 | Rivera | G03B 21/00 345/419 |
| 2006/0192925 A1* | 8/2006 | Chang | G03B 21/14 353/94 |
| 2007/0130020 A1* | 6/2007 | Paolini | G06Q 30/0603 705/26.62 |
| 2007/0179867 A1* | 8/2007 | Glazer | G06Q 30/0253 705/26.43 |
| 2007/0192203 A1* | 8/2007 | Di Stefano | G06Q 30/0643 705/26.8 |
| 2007/0282695 A1* | 12/2007 | Toper | G06Q 30/0635 705/26.81 |
| 2007/0294622 A1* | 12/2007 | Sterner | G11B 27/105 715/716 |
| 2008/0238916 A1* | 10/2008 | Ghosh | G06T 19/00 345/419 |
| 2008/0249897 A1* | 10/2008 | Oh | G06Q 30/02 705/27.2 |
| 2008/0255957 A1* | 10/2008 | Erdem | G06Q 30/0633 705/26.61 |
| 2009/0077504 A1* | 3/2009 | Bell | G06F 3/04812 715/863 |
| 2009/0113349 A1* | 4/2009 | Zohar | G06Q 30/00 715/852 |
| 2009/0288012 A1* | 11/2009 | Hertel | G06Q 20/326 715/738 |
| 2010/0005424 A1* | 1/2010 | Sundaresan | G06F 16/5854 715/849 |
| 2010/0010902 A1* | 1/2010 | Casey | G06Q 20/208 705/17 |
| 2010/0026723 A1* | 2/2010 | Nishihara | G06F 3/04886 345/671 |
| 2010/0070378 A1* | 3/2010 | Trotman | G06Q 30/0643 705/26.1 |
| 2010/0091015 A1* | 4/2010 | Heidel | G06T 15/00 345/419 |
| 2010/0115425 A1* | 5/2010 | Bokor | A63F 13/85 715/757 |
| 2010/0149311 A1 | 6/2010 | Kroll et al. | |
| 2010/0169837 A1* | 7/2010 | Hyndman | G06F 16/9558 715/848 |
| 2010/0177164 A1* | 7/2010 | Zalevsky | G01B 11/2441 348/46 |
| 2010/0281432 A1* | 11/2010 | Geisner | G06F 3/017 715/849 |
| 2010/0295847 A1* | 11/2010 | Titus | G06T 17/00 345/419 |
| 2010/0306712 A1* | 12/2010 | Snook | G06K 9/00342 715/863 |
| 2011/0078055 A1* | 3/2011 | Faribault | G06Q 30/02 705/27.2 |
| 2011/0119640 A1* | 5/2011 | Berkes | G06F 3/017 715/863 |
| 2011/0128555 A1* | 6/2011 | Rotschild | G06F 3/017 356/625 |
| 2011/0178924 A1* | 7/2011 | Briscoe | G06Q 20/105 705/41 |
| 2011/0187706 A1* | 8/2011 | Vesely | G06T 15/00 345/419 |

(56) References Cited

U.S. PATENT DOCUMENTS

| | | | |
|---|---|---|---|
| 2011/0246329 A1* | 10/2011 | Geisner | G06F 3/017 705/27.1 |
| 2011/0251928 A1* | 10/2011 | Van Buskirk | G06Q 30/06 705/27.2 |
| 2012/0005624 A1* | 1/2012 | Vesely | G06F 3/04842 715/808 |
| 2012/0017147 A1* | 1/2012 | Mark | H04N 9/3173 715/702 |
| 2012/0022924 A1* | 1/2012 | Runnels | G06F 3/011 705/14.4 |
| 2012/0056989 A1* | 3/2012 | Izumi | H04N 13/378 348/46 |
| 2012/0162214 A1* | 6/2012 | Chavez | H04N 13/111 345/419 |
| 2012/0182403 A1* | 7/2012 | Lange | G02B 27/22 348/51 |
| 2012/0212509 A1* | 8/2012 | Benko | G06F 3/033 345/633 |
| 2012/0239513 A1* | 9/2012 | Oliver | G06Q 30/0643 705/14.73 |
| 2012/0293411 A1* | 11/2012 | Leithinger | G06F 3/04886 345/158 |
| 2012/0293632 A1* | 11/2012 | Yukich | H04N 5/247 348/47 |
| 2012/0330781 A1* | 12/2012 | Borrero | G06Q 30/00 705/26.8 |
| 2013/0024371 A1* | 1/2013 | Hariramani | G06Q 20/384 705/41 |
| 2013/0033484 A1* | 2/2013 | Liao | H04N 9/3179 345/419 |
| 2013/0038528 A1* | 2/2013 | Fein | G06F 3/011 345/156 |
| 2013/0042296 A1* | 2/2013 | Hastings | G06F 21/10 726/1 |
| 2013/0063559 A1* | 3/2013 | Moshe | G01B 11/25 348/43 |
| 2013/0073388 A1 | 3/2013 | Heath | |
| 2013/0091445 A1* | 4/2013 | Treadway | G06F 3/0481 715/762 |
| 2013/0110666 A1* | 5/2013 | Aubrey | G06Q 30/0269 705/26.5 |
| 2013/0159081 A1* | 6/2013 | Shastry | G06Q 30/0274 705/14.23 |
| 2013/0166332 A1* | 6/2013 | Hammad | G06Q 20/12 705/5 |
| 2013/0182077 A1* | 7/2013 | Holz | G06K 9/6202 348/46 |
| 2013/0215116 A1* | 8/2013 | Siddique | G06Q 30/0643 345/420 |
| 2013/0215148 A1* | 8/2013 | Antonyuk | G06F 3/017 345/633 |
| 2013/0215393 A1* | 8/2013 | Kim | G02B 27/2292 353/10 |
| 2013/0229396 A1* | 9/2013 | Huebner | H04N 9/3147 345/207 |
| 2013/0234934 A1* | 9/2013 | Champion | G06F 3/012 345/156 |
| 2013/0265306 A1* | 10/2013 | Landweber | G06T 15/503 345/426 |
| 2013/0268357 A1* | 10/2013 | Heath | H04L 63/00 705/14.53 |
| 2013/0321346 A1* | 12/2013 | Tyler | G06F 3/0488 345/175 |
| 2013/0339906 A1* | 12/2013 | Barthelt | G06Q 30/0643 715/850 |
| 2014/0006129 A1* | 1/2014 | Heath | G06Q 30/0222 705/14.23 |
| 2014/0032362 A1* | 1/2014 | Frayman | G06Q 30/0633 705/26.8 |
| 2014/0080109 A1* | 3/2014 | Haseltine | A63F 13/06 434/308 |
| 2014/0100994 A1* | 4/2014 | Tatzel | G06Q 30/0276 705/27.1 |
| 2014/0100995 A1* | 4/2014 | Koshy | G06Q 30/0643 705/27.2 |
| 2014/0100996 A1* | 4/2014 | Klein | G06T 1/00 705/27.2 |
| 2014/0100997 A1* | 4/2014 | Mayerle | G06Q 30/0276 705/27.2 |
| 2014/0129354 A1* | 5/2014 | Soon-Shiong | G06Q 10/087 705/16 |
| 2014/0129990 A1* | 5/2014 | Xin | G06K 9/6201 715/849 |
| 2014/0143136 A1* | 5/2014 | Dhar | G07F 5/24 705/39 |
| 2014/0143683 A1* | 5/2014 | Underwood, IV | G06F 3/0482 715/752 |
| 2014/0215365 A1* | 7/2014 | Hiraga | G06F 3/0488 715/765 |
| 2014/0253692 A1* | 9/2014 | Wilson | G06F 3/011 348/47 |
| 2014/0279242 A1* | 9/2014 | Staicut | G06Q 30/0623 705/26.61 |
| 2014/0281869 A1* | 9/2014 | Yob | G06F 40/186 715/217 |
| 2014/0282220 A1* | 9/2014 | Wantland | G06F 3/04845 715/782 |
| 2014/0316920 A1* | 10/2014 | Wolfe | G06Q 20/387 705/26.1 |
| 2014/0317575 A1* | 10/2014 | Ullmann | G06T 19/20 715/852 |
| 2014/0327747 A1* | 11/2014 | Kong | G02B 27/2292 348/51 |
| 2014/0333899 A1* | 11/2014 | Smithwick | G02B 21/00 353/10 |
| 2014/0376773 A1* | 12/2014 | Holz | G06F 3/0304 382/103 |
| 2015/0006332 A1* | 1/2015 | Kinarti | G06Q 10/10 705/27.1 |
| 2015/0012426 A1* | 1/2015 | Purves | G06Q 30/0623 705/41 |
| 2015/0022444 A1* | 1/2015 | Ooi | G06K 9/00671 345/156 |
| 2015/0033191 A1* | 1/2015 | Mankowski | G06F 3/04815 715/848 |
| 2015/0049080 A1* | 2/2015 | Purayil | H04L 67/2847 345/419 |
| 2015/0094142 A1* | 4/2015 | Stafford | G06F 3/017 463/31 |
| 2015/0097768 A1* | 4/2015 | Holz | G06F 1/1686 345/156 |
| 2015/0130701 A1* | 5/2015 | Kimenkowski | G06T 19/20 345/156 |
| 2015/0134547 A1* | 5/2015 | Oikonomidis | G06F 16/9554 705/306 |
| 2015/0154588 A1* | 6/2015 | Purves | G06Q 30/0641 705/14.27 |
| 2015/0169076 A1* | 6/2015 | Cohen | G06F 3/0304 345/156 |
| 2015/0170256 A1* | 6/2015 | Pettyjohn | G06F 3/04812 705/14.49 |
| 2015/0186984 A1* | 7/2015 | Loganathan | G06Q 30/0641 705/27.1 |
| 2015/0220244 A1* | 8/2015 | Vats | G06F 3/04815 715/850 |
| 2015/0268817 A1* | 9/2015 | Phan | G06Q 10/06 715/838 |
| 2015/0304568 A1* | 10/2015 | Ikeda | H04N 5/23222 348/222.1 |
| 2015/0309705 A1* | 10/2015 | Keeler | G06Q 30/0643 705/27.2 |
| 2015/0310539 A1* | 10/2015 | McCoy | G06Q 30/0623 705/27.1 |
| 2015/0316985 A1* | 11/2015 | Levesque | G06T 19/006 345/156 |
| 2015/0324940 A1* | 11/2015 | Samson | G06Q 10/06313 705/7.23 |

(56) References Cited

U.S. PATENT DOCUMENTS

| | | | |
|---|---|---|---|
| 2015/0350628 A1* | 12/2015 | Sanders | G06T 15/08 345/419 |
| 2015/0363001 A1* | 12/2015 | Malzbender | G06F 40/274 706/18 |
| 2016/0004335 A1* | 1/2016 | Hosenpud | G06F 3/0346 345/157 |
| 2016/0012491 A1* | 1/2016 | Shah | G06Q 30/0267 705/14.58 |
| 2016/0026249 A1* | 1/2016 | Glass | G06F 3/016 715/702 |
| 2016/0027042 A1* | 1/2016 | Heeter | G06Q 30/0248 705/14.47 |
| 2016/0042554 A1* | 2/2016 | Ogan | G02B 27/2278 345/419 |
| 2016/0057511 A1* | 2/2016 | Mullins | H04Q 9/00 340/870.07 |
| 2016/0063588 A1* | 3/2016 | Gadre | G06F 16/9537 705/26.61 |
| 2016/0104235 A1* | 4/2016 | Benkar | G06Q 30/0643 705/27.2 |
| 2016/0109954 A1* | 4/2016 | Harris | G06K 9/00671 345/156 |
| 2016/0132962 A1* | 5/2016 | Xia | G06Q 30/0641 705/27.2 |
| 2016/0147233 A1* | 5/2016 | Whinnery | G06F 3/04886 701/2 |
| 2016/0170603 A1* | 6/2016 | Bastien | G06F 3/005 348/49 |
| 2016/0171597 A1* | 6/2016 | Todeschini | G06Q 30/0623 705/26.61 |
| 2016/0180590 A1* | 6/2016 | Kamhi | G06K 9/00671 345/633 |
| 2016/0217623 A1* | 7/2016 | Singh | G09G 3/003 |
| 2016/0239080 A1* | 8/2016 | Margolina | G06F 3/011 |
| 2016/0239092 A1* | 8/2016 | Junuzovic | G06F 3/017 |
| 2016/0247219 A1* | 8/2016 | Sorensen | G06F 16/9537 |
| 2016/0253844 A1* | 9/2016 | Petrovskaya | G06Q 50/01 345/633 |
| 2016/0275723 A1* | 9/2016 | Singh | G06F 3/04845 |
| 2016/0284121 A1* | 9/2016 | Azuma | H04N 13/388 |
| 2016/0292966 A1* | 10/2016 | Denham | G06Q 30/0643 |
| 2016/0300294 A1* | 10/2016 | Roche | G06F 3/04845 |
| 2016/0306431 A1* | 10/2016 | Stafford | G02B 27/017 |
| 2016/0313816 A1* | 10/2016 | Krishnakumar | G06F 3/0488 |
| 2016/0313866 A1* | 10/2016 | Pacheco | G06F 3/0488 |
| 2016/0335712 A1* | 11/2016 | Tapley | G06F 3/04815 |
| 2016/0349851 A1 | 12/2016 | Eskolin et al. | |
| 2016/0350842 A1* | 12/2016 | Glass | G11B 27/031 |
| 2016/0378887 A1* | 12/2016 | Maldonado | G06Q 30/0635 705/26.81 |
| 2017/0001111 A1* | 1/2017 | Willette | A63F 13/85 |
| 2017/0003784 A1* | 1/2017 | Garg | A63F 13/87 |
| 2017/0006074 A1* | 1/2017 | Oates, III | H04L 65/4069 |
| 2017/0052632 A1* | 2/2017 | Kamamori | G06F 3/0425 |
| 2017/0054569 A1* | 2/2017 | Harms | G06F 3/017 |
| 2017/0061700 A1* | 3/2017 | Urbach | H04N 13/344 |
| 2017/0132841 A1* | 5/2017 | Morrison | G06T 19/006 |
| 2017/0132842 A1* | 5/2017 | Morrison | G06T 19/006 |
| 2017/0139375 A1* | 5/2017 | Chung | G03H 1/0005 |
| 2017/0178266 A1 | 6/2017 | Schmidt | |
| 2017/0186166 A1* | 6/2017 | Grunnet-Jepsen | H04N 13/239 |
| 2017/0192493 A1* | 7/2017 | Ofek | G06F 3/04883 |
| 2017/0193087 A1* | 7/2017 | Savliwala | G06F 40/284 |
| 2017/0223321 A1* | 8/2017 | Kang | G06F 3/0488 |
| 2017/0243022 A1* | 8/2017 | Corazza | G06T 15/06 |
| 2017/0249693 A1* | 8/2017 | Greenwood | G06T 15/00 |
| 2017/0262154 A1* | 9/2017 | Black | G02B 27/0093 |
| 2017/0270715 A1* | 9/2017 | Lindsay | G06T 7/70 |
| 2017/0282062 A1* | 10/2017 | Black | A63F 13/323 |
| 2017/0315721 A1* | 11/2017 | Merel | G06F 3/04815 |
| 2017/0358096 A1* | 12/2017 | Boss | G06K 9/00671 |
| 2017/0358138 A1* | 12/2017 | Dack | G06T 19/006 |
| 2017/0359690 A1* | 12/2017 | Crutchfield | G06F 3/167 |
| 2017/0371432 A1* | 12/2017 | Gavriliuc | G06F 3/016 |
| 2018/0004481 A1* | 1/2018 | Fallon | G09G 5/00 |
| 2018/0005437 A1* | 1/2018 | Anderson | G06F 3/011 |
| 2018/0052919 A1* | 2/2018 | Feldman | G06Q 30/0623 |
| 2018/0075294 A1* | 3/2018 | Shahar | G06T 7/74 |
| 2018/0088741 A1* | 3/2018 | Matsumura | G06T 7/254 |
| 2018/0101239 A1* | 4/2018 | Yin | G06F 3/04842 |
| 2018/0101986 A1* | 4/2018 | Burns | G06T 19/006 |
| 2018/0114264 A1* | 4/2018 | Rafii | G06Q 30/0643 |
| 2018/0114353 A1* | 4/2018 | Champion | G06T 15/005 |
| 2018/0130255 A1* | 5/2018 | Hazeghi | H04N 13/243 |
| 2018/0136465 A1* | 5/2018 | Chi | G02B 27/0172 |
| 2018/0139203 A1* | 5/2018 | Dolan | G06F 21/32 |
| 2018/0150810 A1* | 5/2018 | Lee | G06T 11/60 |
| 2018/0150844 A1* | 5/2018 | Dolan | G06Q 20/204 |
| 2018/0158060 A1* | 6/2018 | Adams | G06Q 20/3224 |
| 2018/0165675 A1* | 6/2018 | Isaacson | G06Q 40/02 |
| 2018/0165977 A1* | 6/2018 | Johansen | G09B 5/02 |
| 2018/0165984 A1* | 6/2018 | Waldron | G09B 5/02 |
| 2018/0181803 A1* | 6/2018 | Zhang | G06T 7/136 |
| 2018/0190003 A1* | 7/2018 | Upadhyay | G06T 19/003 |
| 2018/0197340 A1* | 7/2018 | Loberg | G06F 30/00 |
| 2018/0205876 A1* | 7/2018 | Paulus | H04L 9/3226 |
| 2018/0211183 A1* | 7/2018 | Innes | G06Q 10/02 |
| 2018/0218538 A1* | 8/2018 | Short | G02B 27/017 |
| 2018/0232662 A1* | 8/2018 | Solomon | G06F 3/167 |
| 2018/0246983 A1* | 8/2018 | Rathod | H04L 63/102 |
| 2018/0247024 A1* | 8/2018 | Divine | G16H 20/40 |
| 2018/0247359 A1* | 8/2018 | Kressler | G06Q 20/342 |
| 2018/0247370 A1* | 8/2018 | Nickerson | G06F 3/0304 |
| 2018/0260089 A1* | 9/2018 | Hudson | G06F 9/453 |
| 2018/0260680 A1* | 9/2018 | Finkelstein | G06N 3/006 |
| 2018/0260874 A1* | 9/2018 | Balan | G06Q 30/0625 |
| 2018/0284885 A1* | 10/2018 | Kim | H04N 13/344 |
| 2018/0307303 A1* | 10/2018 | Powderly | G02B 27/0179 |
| 2018/0307397 A1* | 10/2018 | Hastings | G06F 3/04815 |
| 2018/0315040 A1* | 11/2018 | Isaacson | G06Q 40/02 |
| 2018/0329209 A1* | 11/2018 | Nattukallingal | G02B 27/01 |
| 2018/0342103 A1* | 11/2018 | Schwarz | G06F 3/017 |
| 2018/0350133 A1* | 12/2018 | Gervasio | H04N 19/597 |
| 2018/0350144 A1* | 12/2018 | Rathod | H04W 4/029 |
| 2018/0350145 A1* | 12/2018 | Byl | G06F 3/017 |
| 2018/0350516 A1* | 12/2018 | Dandekar | G01R 29/10 |
| 2018/0357710 A1* | 12/2018 | Nickerson | G06Q 30/0633 |
| 2018/0365893 A1* | 12/2018 | Mullins | G02B 27/0172 |
| 2018/0374066 A1* | 12/2018 | Shrivastava | G06Q 20/227 |
| 2019/0004688 A1* | 1/2019 | Bowen | G06T 11/60 |
| 2019/0005724 A1* | 1/2019 | Pahud | G06T 7/70 |
| 2019/0018498 A1* | 1/2019 | West | G06T 19/006 |
| 2019/0018567 A1* | 1/2019 | Murphy | G06F 3/0346 |
| 2019/0034056 A1* | 1/2019 | Eisenmann | G06F 3/04815 |
| 2019/0035000 A1* | 1/2019 | Soltanipour | H04L 51/32 |
| 2019/0050427 A1* | 2/2019 | Wiesel | G06N 20/10 |
| 2019/0050547 A1* | 2/2019 | Welsh | G06Q 10/10 |
| 2019/0052870 A1* | 2/2019 | Lutter | H04N 19/119 |
| 2019/0065028 A1* | 2/2019 | Chashchin-Semenov | H04L 67/38 |
| 2019/0068765 A1* | 2/2019 | Wilens | G03B 17/56 |
| 2019/0087842 A1* | 3/2019 | Koenig | G06Q 30/0209 |
| 2019/0090025 A1* | 3/2019 | Chesson | H04N 21/47815 |
| 2019/0095905 A1* | 3/2019 | Shrivastava | G06Q 20/3223 |
| 2019/0095906 A1* | 3/2019 | Shrivastava | G06Q 20/3223 |
| 2019/0107935 A1* | 4/2019 | Spivack | G06T 13/40 |
| 2019/0108578 A1* | 4/2019 | Spivack | G09G 5/14 |
| 2019/0108672 A1* | 4/2019 | Ghelberg | G06T 17/20 |
| 2019/0129607 A1* | 5/2019 | Saurabh | G06F 3/04845 |
| 2019/0130462 A1* | 5/2019 | Tietzen | G06Q 30/0605 |
| 2019/0130655 A1* | 5/2019 | Gupta | G06T 19/20 |
| 2019/0132569 A1* | 5/2019 | Karpenko | H04N 5/23238 |
| 2019/0138266 A1* | 5/2019 | Takechi | G06F 3/167 |
| 2019/0146219 A1* | 5/2019 | Rodriguez, II | G06F 3/0482 345/633 |
| 2019/0156715 A1* | 5/2019 | James | G09G 3/003 |
| 2019/0163985 A1* | 5/2019 | Wang | G06K 9/00778 |
| 2019/0172262 A1* | 6/2019 | McHugh | G06F 3/012 |
| 2019/0179405 A1* | 6/2019 | Sun | G06F 3/011 |
| 2019/0197542 A1* | 6/2019 | Kirby | G06Q 20/4014 |
| 2019/0197553 A1* | 6/2019 | Conway | G06Q 20/40145 |
| 2019/0205851 A1* | 7/2019 | Sinha | G06F 3/011 |

(56) References Cited

U.S. PATENT DOCUMENTS

| | | | |
|---|---|---|---|
| 2019/0212827 A1* | 7/2019 | Kin | G02B 27/0179 |
| 2019/0220850 A1* | 7/2019 | Crowe | G06Q 20/322 |
| 2019/0220851 A1* | 7/2019 | Barnes | G06Q 20/3672 |
| 2019/0240508 A1* | 8/2019 | Friman | A61N 5/1037 |
| 2019/0243138 A1* | 8/2019 | Peltola | G06T 17/10 |
| 2019/0244426 A1* | 8/2019 | Knoppert | G06T 19/20 |
| 2019/0258318 A1* | 8/2019 | Qin | G06F 3/04842 |
| 2019/0272079 A1* | 9/2019 | Woodward | G06T 19/003 |
| 2019/0279276 A1* | 9/2019 | Leano | A63F 13/335 |
| 2019/0279283 A1* | 9/2019 | Benkar | G06Q 30/0643 |
| 2019/0279373 A1* | 9/2019 | Boss | G06T 7/33 |
| 2019/0279417 A1* | 9/2019 | Castaneda | G06T 15/20 |
| 2019/0287125 A1* | 9/2019 | Kumar | G06Q 30/0206 |
| 2019/0287311 A1* | 9/2019 | Bhatnagar | G06F 3/017 |
| 2019/0304166 A1* | 10/2019 | Yu | G06F 3/04845 |
| 2019/0304201 A1* | 10/2019 | Cuthbertson | G06T 19/20 |
| 2019/0311341 A1* | 10/2019 | Rice | G06F 3/011 |
| 2019/0311512 A1* | 10/2019 | VanBlon | G06T 11/60 |
| 2019/0311550 A1* | 10/2019 | Cuthbertson | G06T 19/20 |
| 2019/0313059 A1* | 10/2019 | Agarawala | G06F 3/011 |
| 2019/0324558 A1* | 10/2019 | Kimenkowski | G06T 7/73 |
| 2019/0325498 A1* | 10/2019 | Clark | G06K 7/1417 |
| 2019/0332758 A1* | 10/2019 | Yin | G06Q 20/3821 |
| 2019/0339837 A1* | 11/2019 | Furtwangler | G06F 3/04842 |
| 2019/0340816 A1* | 11/2019 | Rogers | H04L 67/22 |
| 2019/0340818 A1* | 11/2019 | Furtwangler | G06F 1/163 |
| 2019/0340833 A1* | 11/2019 | Furtwangler | G06F 16/245 |
| 2019/0355050 A1* | 11/2019 | Geisler | G06T 19/006 |
| 2019/0362562 A1* | 11/2019 | Benson | G06K 9/00671 |
| 2019/0385367 A1* | 12/2019 | Labron | G06F 3/011 |
| 2020/0005539 A1* | 1/2020 | Hwang | G02B 27/0172 |
| 2020/0034011 A1* | 1/2020 | Shen | G06F 3/04815 |
| 2020/0035025 A1* | 1/2020 | Crocker | G06T 19/006 |
| 2020/0035026 A1* | 1/2020 | Demirchian | G06T 19/006 |
| 2020/0043240 A1* | 2/2020 | Abe | A63F 13/795 |
| 2020/0050259 A1* | 2/2020 | Lam | G06F 3/04815 |
| 2020/0064911 A1* | 2/2020 | Mine | G06F 3/012 |
| 2020/0064996 A1* | 2/2020 | Giusti | G01S 13/42 |
| 2020/0066049 A1* | 2/2020 | Sun | A63F 13/80 |
| 2020/0066236 A1* | 2/2020 | Giusti | G06K 9/3208 |
| 2020/0082629 A1* | 3/2020 | Jones | G06T 7/70 |
| 2020/0104025 A1* | 4/2020 | Iglesias | G06F 3/0488 |
| 2020/0105057 A1* | 4/2020 | Horowitz | G06K 9/00355 |
| 2020/0111267 A1* | 4/2020 | Stauber | G02B 27/017 |
| 2020/0117336 A1* | 4/2020 | Mani | G06F 16/904 |
| 2020/0118343 A1* | 4/2020 | Koblin | H04N 5/23293 |
| 2020/0122405 A1* | 4/2020 | Bigos | G06T 17/205 |
| 2020/0130089 A1* | 4/2020 | Ivkovich | B23K 9/0956 |
| 2020/0132474 A1* | 4/2020 | Comer | G02B 27/017 |
| 2020/0139471 A1* | 5/2020 | Pliska | B23K 9/0956 |
| 2020/0143591 A1* | 5/2020 | Watkins | G06F 3/011 |
| 2020/0147712 A1* | 5/2020 | Pliska | B23K 9/0956 |
| 2020/0165859 A1* | 5/2020 | Hong | G06T 7/20 |
| 2020/0193206 A1* | 6/2020 | Turkelson | G06K 9/00671 |
| 2020/0202390 A1* | 6/2020 | Gregori | G06K 9/22 |
| 2020/0219319 A1* | 7/2020 | Lashmar | H04L 63/10 |
| 2020/0225758 A1* | 7/2020 | Tang | G06N 3/02 |
| 2020/0225830 A1* | 7/2020 | Tang | G02B 27/0093 |
| 2020/0226599 A1* | 7/2020 | Adams | G06Q 20/401 |
| 2020/0276503 A1* | 9/2020 | Marchiorello | A63F 13/428 |
| 2020/0302693 A1* | 9/2020 | Singh | G06T 19/003 |
| 2020/0320794 A1* | 10/2020 | Huang | G06T 15/20 |
| 2020/0360816 A1* | 11/2020 | Cahill | G06T 19/006 |
| 2020/0379625 A1* | 12/2020 | Wang | G06F 3/011 |
| 2020/0391442 A1* | 12/2020 | Boss | B29C 64/386 |
| 2020/0393952 A1* | 12/2020 | Hsiao | G06F 3/04815 |
| 2020/0401576 A1* | 12/2020 | Yerli | G06F 9/46 |
| 2020/0410766 A1* | 12/2020 | Swaminathan | G06T 19/006 |
| 2021/0019948 A1* | 1/2021 | Short | G06F 3/04815 |
| 2021/0029339 A1* | 1/2021 | Liu | H04N 21/2393 |
| 2021/0042019 A1* | 2/2021 | Densham | G06F 3/04815 |
| 2021/0082044 A1* | 3/2021 | Sliwka | G06Q 40/025 |
| 2021/0118232 A1* | 4/2021 | Scott, II | G06F 3/017 |
| 2021/0200776 A1* | 7/2021 | Pounds | G06F 16/9035 |
| 2021/0201336 A1* | 7/2021 | Mallett | G06F 3/04842 |
| 2021/0201587 A1* | 7/2021 | Mehr | G06T 7/75 |
| 2021/0203727 A1* | 7/2021 | Pounds | G06F 16/9537 |
| 2021/0225087 A1* | 7/2021 | Sudol | G06T 19/006 |
| 2021/0233062 A1* | 7/2021 | Clark | G06Q 20/3672 |
| 2021/0241362 A1* | 8/2021 | Nguyen | G01S 19/01 |

* cited by examiner

INTERACTIVE 3D IMAGE PROJECTION SYSTEMS AND METHODS

BACKGROUND

The field of the disclosure relates generally to three-dimensional (3D) images and, more specifically, to network-based systems and methods for providing user interactions with 3D images.

Holidays can be a stressful time for many people. Winter holidays, for example, often involve activities such as arranging decorations with ornaments, purchasing gifts, hosting parties with friends and family, and preparing elaborate meals. Other events, such as weddings and birthday parties, may require extensive planning by both the hosts and the guests. A host of such an event may wish to acquire decorations that are difficult and expensive to obtain. Removal of the decorations afterwards may also be time-consuming and costly. For example, in many cultures, decorating a Christmas tree during the winter holidays may include purchasing a large tree, transporting the tree to the display site, decorating the tree with ornaments, maintaining the tree over the course of the holiday season, and finally removing and packing the ornaments and transporting the tree for trash collection afterwards.

Furthermore, guests attending holiday events or parties to celebrate special occasions may wish to bring a gift to present to the host or other attendees of the event. However, shopping for gifts can be a time consuming activity. Predicting an appropriate gift for a recipient may be a particularly difficult task, especially if the recipient's interests are not well known. In some cases, a registry of gift ideas may be made available by the recipient. However, many people do not maintain a list of desirable items for all of the holiday events that occur throughout a calendar year.

BRIEF DESCRIPTION

In one aspect, a 3D interface generator computing device is provided. The 3D interface generator includes at least one sensor, a projector, and a memory device configured to store (i) 3D image data corresponding to a 3D image, wherein the 3D image includes a plurality of 3D elements, (ii) identification information for a plurality of individuals, wherein each of the plurality of individuals is associated with a respective one of the 3D elements, and (iii) sets of list data, each set of list data associated with a respective one of a plurality of individuals and identifying a plurality of purchase options. The 3D interface generator also includes at least one processor communicatively coupled to the memory device, the projector, and the at least one sensor. The at least one processor is configured to command the projector to project the 3D image into a real-world space. The at least one processor is also configured to receive, from the at least one sensor, an indication of a first physical interaction by a user with a first of the 3D elements in the real-world space. The at least one processor is further configured to retrieve, from the memory device in response to the first physical interaction, a first of the individuals associated with the first 3D element, and a first of the sets of list data associated with the first individual. The at least one processor is also configured to command the projector to overlay a plurality of purchase option images onto the 3D image in the real-world space, each of the purchase option images representing a respective one of the purchase options in the first set of list data. The at least one processor is further configured to receive, from the at least one sensor, an indication of a second physical interaction by the user with one of the purchase option images in the real-world space. The at least one processor is also configured to generate, in response to the second physical interaction, a purchase transaction request by the user of the one of the purchase options.

In another aspect, a computer-implemented method, the method executed by a 3D interface generator computing device that includes at least one sensor, a projector, and a memory device configured to store (i) 3D image data corresponding to a 3D image, wherein the 3D image includes a plurality of 3D elements, (ii) identification information for a plurality of individuals, wherein each of the plurality of individuals is associated with a respective one of the 3D elements, and (iii) sets of list data, each set of list data associated with a respective one of a plurality of individuals and identifying a plurality of purchase options. The 3D interface generator computing device also includes at least one processor communicatively coupled to the memory device, the projector, and the at least one sensor. The method includes commanding the projector to project the 3D image into a real-world space. The method also includes receiving, from the at least one sensor, an indication of a first physical interaction with a first of the 3D elements in the real-world space. The method further includes retrieving, from the memory device in response to the first physical interaction by a user, a first of the individuals associated with the first 3D element, and a first of the sets of list data associated with the first individual. The method also includes commanding the projector to overlay a plurality of purchase option images onto the 3D image in the real-world space, each of the purchase option images representing a respective one of the purchase options in the first set of list data. The method further includes receiving, from the at least one sensor, an indication of a second physical interaction by the user with one of the purchase option images in the real-world space. The method also includes generating, in response to the second physical interaction, a purchase transaction request by the user of the one of the purchase options.

In yet another aspect, at least one non-transitory computer-readable storage medium having computer-executable instructions is provided. When executed by a 3D interface generator computing device, including at least one sensor, a projector, a memory device configured to store (i) 3D image data corresponding to a 3D image, wherein the 3D image includes a plurality of 3D elements, (ii) identification information for a plurality of individuals, wherein each of the plurality of individuals is associated with a respective one of the 3D elements, and (iii) sets of list data, each set of list data associated with a respective one of a plurality of individuals and identifying a plurality of purchase options, and at least one processor communicatively coupled to the memory device, the projector, and the at least one sensor, the instructions cause the at least one processor to command the projector to project the 3D image into a real-world space. The computer-executable instructions further cause the at least one processor to receive, from the at least one sensor, an indication of a first physical interaction by a user with a first of the 3D elements in the real-world space. The computer-executable instructions further cause the at least one processor to retrieve, from the memory device in response to the first physical interaction, a first of the individuals associated with the first 3D element, and a first of the sets of list data associated with the first individual. The computer-executable instructions further cause the at least one processor to command the projector to overlay a plurality of purchase option images onto the 3D image in the real-world space, each of the purchase option images representing a respective one of the purchase options in the first set of list data. The computer-executable instructions further cause the at least one processor to receive, from the at least one sensor, an indication of a second physical interaction by the user with one of the purchase option images in the real-world space. The computer-executable instructions further cause the at least 3D interface generator computing device to generate, in response to the second physical interaction, a purchase transaction request by the user of the one of the purchase options.

DETAILED DESCRIPTION

Figure 1:
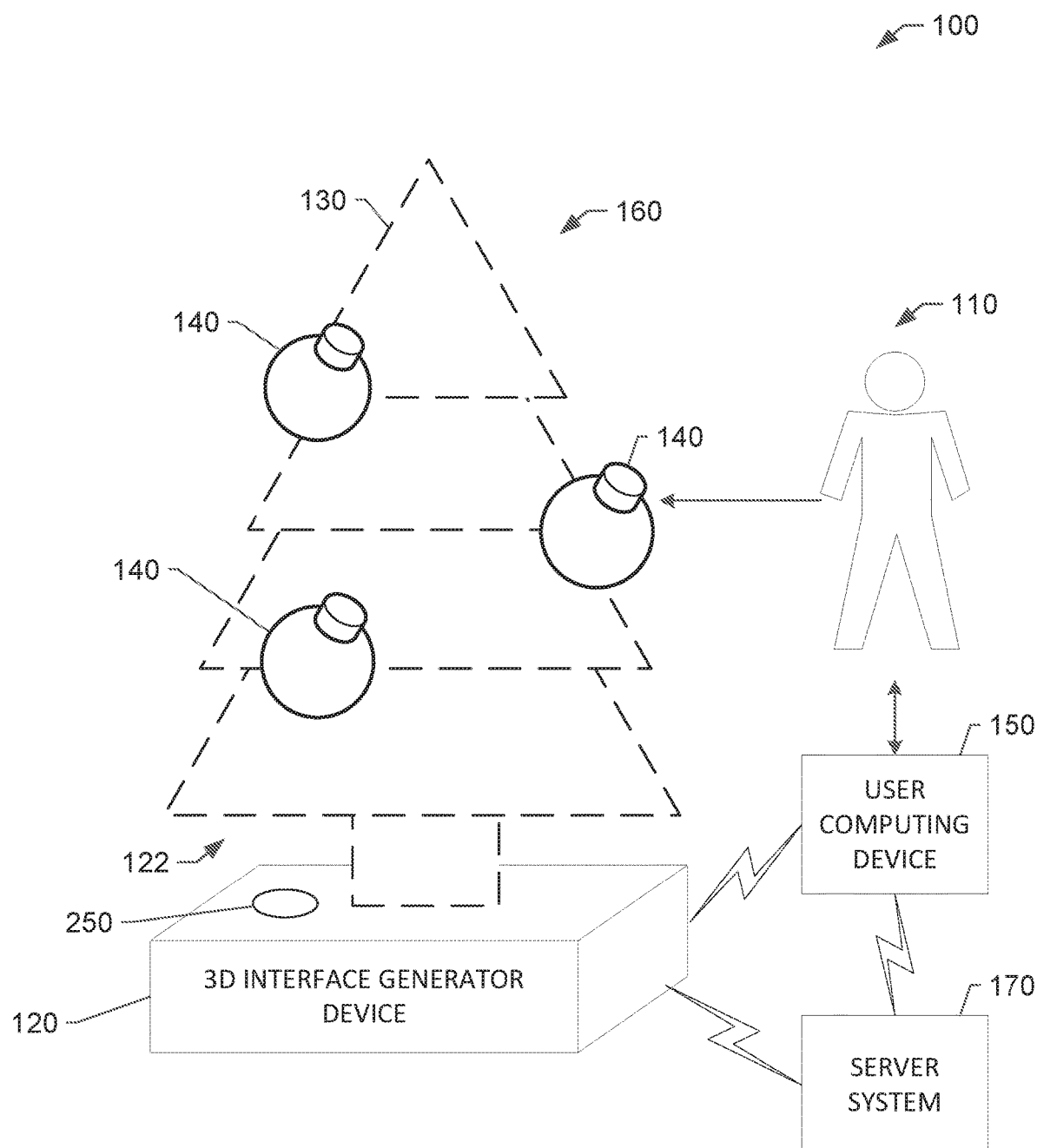
FIG. 1 is a schematic diagram of an example 3D image projection system in accordance with one embodiment of the present disclosure.

The systems and methods described herein are related to 3D image projection systems, and more specifically, to interactive user interface systems for selecting and executing transactions for desired items via interaction with a projected three-dimensional (3D) display.

An interactive 3D image projection system and associated devices and methods are described herein. The interactive 3D image projection system includes a 3D interface generator device that is configured to project a 3D image in real-world space. For example, during the winter holidays, the 3D image may be of a 3D Christmas tree or other 3D holiday decoration. As such, the 3D Christmas tree is projected into a real-world space (e.g., as a volumetric image near the projection device) and is visible to people located near the device.

The 3D image projection system may be reprogrammed to display other 3D images for other occasions or for general decorative purposes. For example, the 3D image projection system may be programmed to display a birthday cake during a child's birthday party, a ghost or ghoul during Halloween, or a sports team's or symbolic emblem during major sporting events or national holidays. In some embodiments, the 3D image projection system may be complemented by other devices to enhance the experience, such as a scent-diffusing system for dispersing a particular holiday fragrance near the 3D image or an audio output system for playing holiday music.

The 3D image projection system also includes sensors to detect and identify nearby users and to facilitate user interactions with the 3D image. For example, a motion sensing input device may be configured to detect hand gestures or other physical interaction performed by a user near the 3D image, thereby allowing the user to interact with the 3D image in various ways (e.g., via the user pointing at, or "pressing," virtual objects within the 3D image). The user may be allowed to customize aspects of the 3D image, such as selecting from various types of trees, changing the size of the tree to fit the real-world space, displaying virtual ornaments or other virtual decorations on the tree, or customizing certain virtual ornaments (e.g., assigning a particular virtual ornament to a friend or relative and uploading an image of that friend or relative to be displayed on the projected 3D ornament).

In one example embodiment, the interactive 3D image projection system assists the user with gift purchasing for a holiday or other event associated with the projected 3D display. For example, the interactive 3D image projection system may allow the user to interact with a virtual ornament associated with a particular friend on the 3D Christmas tree. Interacting with the virtual ornament enables the user to see gift ideas for that friend. When the user presses the virtual ornament, the interactive 3D image projection system displays a list of potential gifts for that friend (e.g., from a gift registry of the friend, based on a profile of the friend). Upon selection of a particular gift, the interactive 3D image projection system executes a purchase transaction of the identified gift on behalf of the user. As such, the interactive 3D image projection system both provides a virtual replacement for the underlying physical object (e.g., in the form of the displayed 3D Christmas tree) as well as provides interactive capabilities that allow the user to perform gift purchases through a natural user interface presented in conjunction with the 3D image.

In some embodiments, the registration of users includes opt-in informed consent of users to data usage by the interactive 3D image projection system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

The technical problems addressed by the systems and methods described includes at least one of the following: (i) storing calendar event data and user information; (ii) displaying a 3D image in a real-world space relevant to the calendar event data; (iii) detecting and identifying nearby users; (iv) adapting the 3D image to user interaction via a natural user interface; (v) displaying identifiers associated with gift recipients; (vi) identifying potential purchases associated with an identified gift recipient; and (vii) executing a transaction based on user interaction via the natural user interface.

The resulting technical effect achieved by the systems and methods described herein is at least one of: (i) replacing a real-world object with a 3D image representing the replaced object; (ii) allowing users to configure presentational aspects of the 3D image; (iii) allowing users to interact with the 3D image via a natural user interface; (iv) automatically presenting gift purchase options for recipients; and (v) allowing users to view gift lists and execute purchase transactions via the natural user interface.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram of an example interactive 3D image projection system (or just "projection system") 100. In the example embodiment, projection system 100 includes a 3D interface generator device 120 (or just "3D device") and a server system 170. 3D device 120 is configured to project a 3D image 160 into a real-world space 122 near to (e.g., above) 3D device 120. In the example embodiment, 3D image 160 is a 3D representation of a Christmas tree 130 (e.g., a virtual Christmas tree). Further, a user 110 may interact (e.g., wirelessly) with 3D device 120 using a user computing device 150 (e.g., for configuring 3D image 160, sharing profile information, detecting proximity of user 110 with 3D device 120, and so forth).

In the example embodiment, 3D image 160 is a three-dimensional image (e.g., a volumetric image). In some embodiments, 3D image 160 is primarily a two-dimensional "planar" image. For example, a "flat" image may be projected vertically, perpendicular to a horizontal plane of 3D device 120, such that a projected virtual screen is displayed to user 110. Additionally or alternatively, a 3D image may be projected on a horizontal plane from 3D device 120 such that user 110 may view downwards from a standing position and interact with the 3D image similar to items on a table.

In the example embodiment, 3D image 160 includes 3D elements 140. In the example embodiment, 3D elements 140 are ornaments associated with a holiday theme and are used to decorate 3D Christmas tree 130. In some embodiments, 3D elements 140 are user configurable. For example, user 110 may record and upload video or images to be displayed as 3D elements 140 or embedded on or integrated with 3D elements 140. In one embodiment, user 110 may purchase additional decorations 140 to customize the "decorations" of 3D Christmas tree 130. In alternative embodiments, 3D elements 140 are any suitable, separately recognizable visual elements overlaid on 3D image 160.

In some embodiments, 3D image 160 may be animated (e.g., include aspects of motion over time). For example, 3D image 160 may rotate about a vertical axis of 3D image 160 (not shown, e.g., the vertical center line of 3D Christmas tree 130), where all aspects about a circumference of 3D image 160 pass a stationary viewing position. Further, 3D elements 140 may also rotate along the same vertical axis with 3D Christmas tree 130 at the same rate of rotation as the 3D Christmas tree 130 such that 3D elements 140 remain relatively stationary with respect to 3D Christmas tree 130 during the rotation. In other words, as user 110 views 3D Christmas tree 130 from a stationary perspective, user 110 is able to view different 3D elements 140 as 3D image 160 rotates. 3D image 160 may be configured to display other animations, videos, or images. Additionally or alternatively, 3D device 120 is configured to modify 3D image 160 in other aspects such as changes in color, lighting, depth, size, shape, intensity, etc. In some embodiments, 3D device 120 is configured to allow user 110 to add or remove additional 3D elements 140 to 3D Christmas tree 130. In some embodiments, 3D elements 140 are animated to move relative to 3D Christmas tree 130. For example, 3D elements 140 may be snowflakes descending around 3D Christmas tree 130.

In the example embodiment, 3D device 120 determines which 3D image 160 to display based on calendar events stored in a memory. More specifically, 3D image 160 may be an image associated with holidays, birthdays, or other events associated with specific dates in a calendar. For example, 3D image 160 may be a birthday cake if the current date is near the stored date of a person's birthday.

In the example embodiment, 3D image 160 is a 3D natural user interface. For example, user 110 interacts with 3D elements 140 to configure the 3D image 160 displayed. Interaction with the 3D user interface is described further below. User 110 may also use user computing device 150 to communicate with 3D device 120. In one embodiment, user computing device 150 communicates wirelessly with 3D device 120 using an app installed on user computing device 150. The app is configured to perform at least similar control functions as may be performed by interacting with 3D image 130 as described below.

Figure 2:
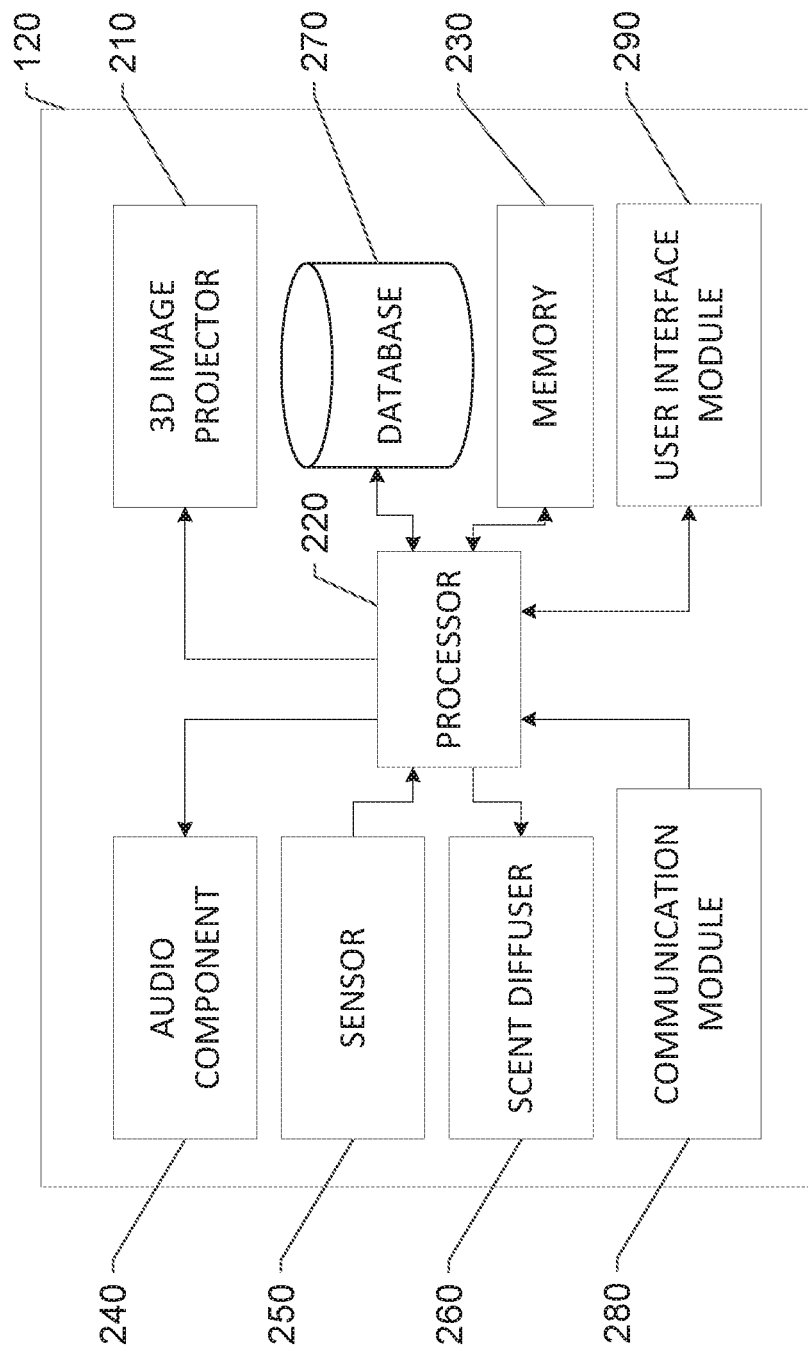
FIG. 2 is a simplified block diagram of a 3D interface generator device shown in FIG. 1.

FIG. 2 is a simplified block diagram illustrating an example embodiment of 3D device 120. Components of 3D device 120 may include, for example, modules such as a 3D image projector 210, a processor 220, a memory 230, an audio component 240, at least one sensor 250, a scent diffuser 260, a database 270, a communication module 280, and a user interface module 290. Additional or fewer components may be used in projection system 100.

In the example embodiment, audio component 240 includes at least one speaker to play pre-recorded audio files such as holiday music. Audio component 240 may be configured to play other sounds such as ambient sounds, alerts, vocalized speech, sounds associated with interaction with the 3D natural user interface, and sounds configured for additional accessibility. Additionally or alternatively, audio component 240 may be configured to stream live music, sounds, or speech. Multiple speaker configurations, including speakers of varying type and size, may be used. In one embodiment, additional speakers in a wireless configuration may be used where 3D device 120 transmits audio data to the additional speakers.

In the example embodiment, audio component 240 includes a microphone or other sound detecting and/or recording equipment. The microphone may be used for detection and identification purposes. In a multi-microphone system, triangulation of sounds may be used to determine the location of individuals nearby. User 110 speaking near 3D device 120 may be identified through vocal speech patterns. In some embodiments, user 110 (shown in FIG. 1) may issue oral commands to 3D device 120 via audio input systems such as a microphone. In other embodiments, user 110 may speak or sing into the microphone for amplification through audio component 240.

The at least one sensor 250 may include any type of sensor including, for example, one or more of a camera, an infrared sensor, a proximity sensor, a motion sensor, a magnetic sensor, an optical sensor, a fingerprint and/or thumbprint scanner, a GPS sensor, or an electromagnetic detection sensor. 3D device 120 may include any number and/or type of sensors 250 to further enhance the functionality of projection system 100.

In one embodiment, the at least one sensor 250 is configured to detect motions near (e.g., above) 3D device 120. For example, the at least one sensor 250 detects motion within a virtual boundary of 3D image 160 and determines that user 110 is interacting with 3D image 160. 3D device 120 determines, based on data received from the at least one sensor 250, a pattern of motion (e.g., a gesture). 3D device 120 compares the gesture to a library of gestures stored in database 270 to determine a corresponding command to execute. For example, if the command is associated with a purchase transaction, 3D device 120 determines that an item represented in the currently displayed 3D image is the desired gift item that user 110 wishes to purchase. 3D device 120 executes a purchase transaction for that gift item.

In one embodiment, a GPS sensor may be used to determine the presence of nearby people. For example, if user computing device 150 is equipped with a GPS module, projection system 100 may determine that, based on the location of 3D device 120 and the location of user computer device 150, user 110 is nearby. Additionally or alternatively, if known users 110 are not present, the 3D image may be adapted to display information relevant to users 110 that are present. Additionally or alternatively, the at least one sensor 250 may also include a proximity sensor acting in conjunction with the GPS module.

User 110 may engage in a payment transaction using the at least one sensor 250. In another embodiment, the at least one sensor 250 includes an infrared sensor configured to detect the presence of people in a low light setting. Additionally or alternatively, the infrared sensor may be used for receiving data transmissions from user computing device 150. In the example embodiment, the at least one sensor 250 includes at least one camera to detect the presence of user 110 and identify user 110 using technologies such as facial recognition. Additionally or alternatively, user 110 may identify themselves via other sensors such as a fingerprint scanner, a keyboard, a touchscreen, an NFC identification card, a payment card reader or using user computing device 150.

In the example embodiment, scent diffuser 260 is configured to enhance the experience of user 110 by releasing into the surrounding air an aroma that is associated with, for example, 3D Christmas tree 130. For example, if 3D Christmas tree 130 is actively displayed, scent diffuser 260 may emit a pine tree aroma. In one embodiment, user 110 may configure 3D device 120 to emit additional or alternative aromas such as cinnamon, pumpkin, spices, or baked goods such as apple pie. In some embodiments, scent diffuser 260 may also include functionality to humidify the surrounding air.

3D image projector 210 may include various technologies configured to generate a 3D holographic image, volumetric image, stereoscopic image, or other visualization designed to simulate or display object depth. In one embodiment, 3D image projector 210 includes at least one mirror and at least one light source such as a laser. In some embodiments, a beam splitter may be used to generate a scattered beam and combined with a reference beam to generate the appearance of a 3D image. In some embodiments, the at least one sensor 250 may be used to receive emitted light and to identify or determine emitted light patterns.

In the example embodiment, 3D image projector 210 receives, from processor 220, commands or instructions regarding patterns or images to generate. Images and/or patterns may be stored in memory 230. Processor 220 retrieves image pattern data from memory 230 for generation using 3D image projector 210. In some embodiments, the particular 3D image selected for generation may be stored in database 270. Database 270 also may store user profiles, and certain images may be associated with specific user profiles stored in database 270. For example, if user 110 has a birthday within a number of days, processor 220 retrieves the date information and determines that the 3D image to be generated is a birthday cake. Processor 220 retrieves 3D birthday cake image data from memory 230 and determines instructions to cause 3D image projector 210 to project the 3D cake. In the example embodiment, processor 220 determines that the current date is around the winter holidays and retrieves from memory 230 3D Christmas tree data. Processor 220 causes 3D image projector 210 to generate the 3D Christmas tree.

Processor 220 may also query database 270 to determine a scent associated with 3D image 160. If a scent is determined, processor 220 causes scent diffuser 260 to emit the associated scent. Multiple scents may be associated with 3D image 160. In some embodiments, multiple scents may be emitted by scent diffuser 260 simultaneously. In other embodiments, scents may be emitted by scent diffuser 260 in a predetermined order. Additionally or alternatively, processor 220 may randomize the order or combination of scents to emit.

Processor 220 may also query database 270 to determine if any sounds are associated with 3D image 160. Processor 220 causes audio component 240 to play the determined sounds. In some embodiments, multiple sounds are associated with 3D image 160. Database 270 may include associated rank or identifiers for the sounds that are associated with 3D image 160. In one embodiment, processor 220 randomizes the order of sounds to be played by audio component 240. In another embodiment, processor 220 synchronizes the audio output with changes in the visual elements of the generated by 3D image projector 210. For example, songs with a specific tempo may accompany corresponding alterations in colors, intensity, or size of 3D image 160 at the rate of the tempo of the song.

In one embodiment, communication module 280 is a NFC device. In other embodiments, communication module 280 may be another device capable of transmission across the electromagnetic frequency spectrum such as a Wi-Fi device capable of connecting to the Internet. In the example embodiment, communication module 280 may communicatively couple 3D device 120 to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem.

User interface module 290 implements a 3D natural user interface and will be described herein.

Figure 3:
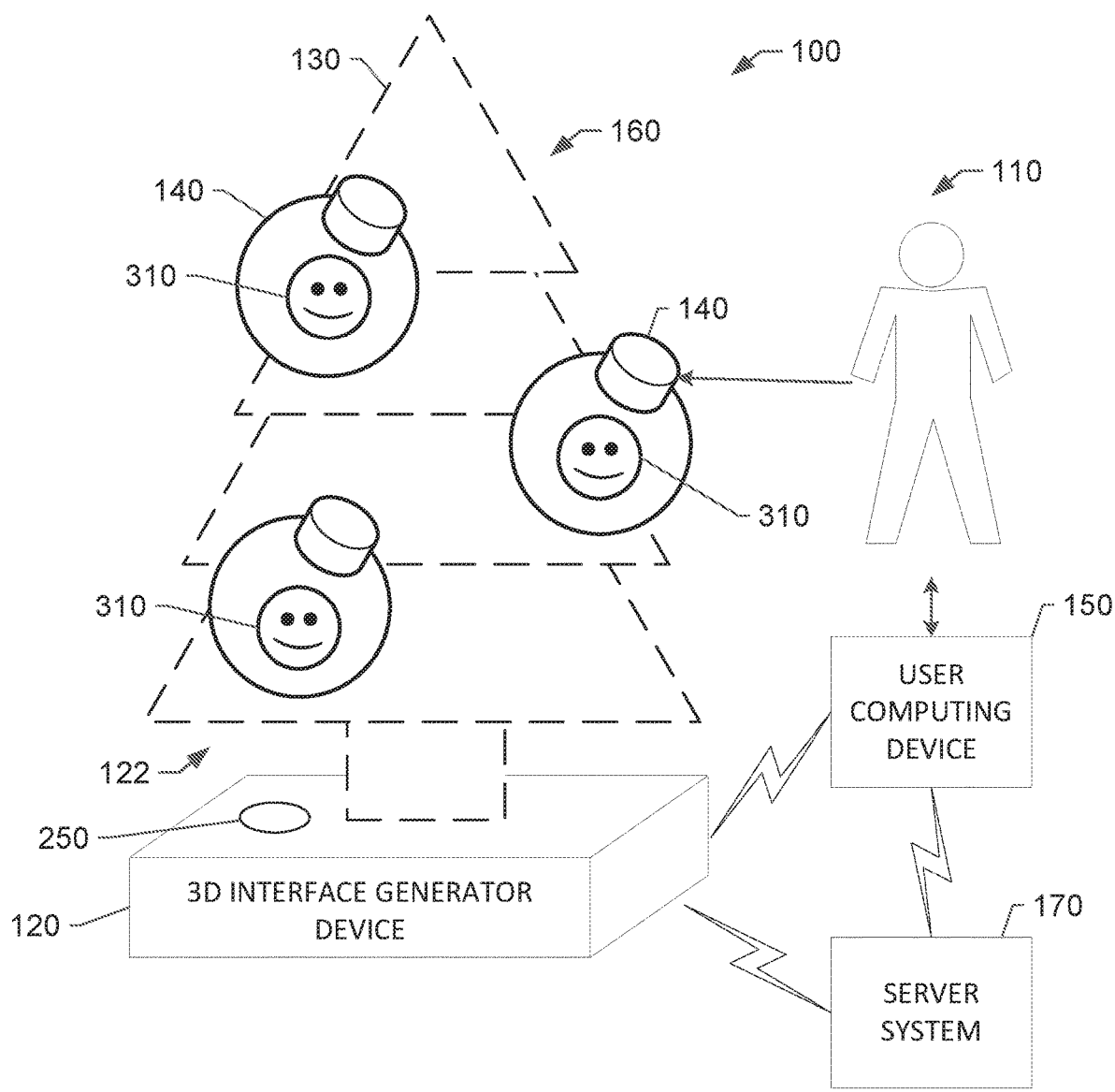
FIG. 3 is a schematic diagram of an example 3D user interface for the 3D image projection system shown in FIG. 1.

FIG. 3 illustrates an example 3D natural user interface that enables user 110 to engage projection system 100. In the example embodiment, 3D device 120 generates 3D image 160. The at least one sensor 250 detects movements performed by user 110. For example, sensor 250 may be configured to detect physical motion performed by user 110. Movements by user 110 may include waving hands and/or fingers, etc. In some embodiments, the at least one sensor 250 may be configured to detect facial movements. In the example embodiment, user 110 interacts with the 3D natural user interface by physical interaction via a gesture or a combination of gestures and/or vocalizations that are matched to stored patterns in database 270. For example, user 110 may use a pointing gesture or a swiping gesture within a proximate distance of a particular 3D element 140. The at least one sensor 250 may determine the location of the gesture and determine that the gesture is near the particular 3D element 140. The at least one sensor 250 may include a motion detection device, such as a plurality of cameras or lasers to identify in real-world space 122 the location of the gesture in a three-coordinate 3D space. The location information is compared to the projection information stored in memory 230 for the 3D image 160. Each 3D element 140 may be associated with a particular person.

In some embodiments, interactions with the 3D natural user interface may be supplemented by data received by user computing device 150. In some embodiments, user computing device 150 is communicatively coupled to 3D device 120. For example, user 110 may activate a 3D decoration 140 by using a gesture. User 110 is then prompted for additional information such as a name, password, code, or confirmation. User 110 may then use user computing device 150 to input the additional information and transmit the data to 3D device 120 by for example, using a keyboard, touchscreen, or other input device associated with user computing device 150. Additionally or alternatively, user computing device 150 may store in memory information about persons associated with user 110 which may be transmitted to 3D device 120. In other embodiments, an app installed on user computing device 150 may be used to select a person associated with user 110, and information about the selected person may be transmitted to 3D device 120.

In the example embodiment, the at least one sensor 250 is configured to identify user 110. For example, user 110 may be identified through image recognition. 3D device 120 retrieves from a database, such as database 270 (shown in FIG. 2), information regarding people associated with user 110. 3D device 120 displays on 3D image 160 identification information 310 for the associated people. In the example embodiment, identification information 310 for each associated person is displayed on respective 3D elements 140. In the example embodiment, a photographic image is overlaid on the 3D elements 140. In some embodiments, identification information 310 may be a 3D image. For example, the 3D image may be a 3D image displayed as enclosed in a 3D space inside decorations 140. In other embodiments, identification information 310 may be text or symbolic identifiers. In some embodiments, identification information 310 may be animated. In some embodiments, identification information 310 is a continuously looping video previously uploaded to 3D device 120, the video identifying a particular person. In some embodiments, audio aspects may also be synchronized to the display of identification information 310.

Figure 4:
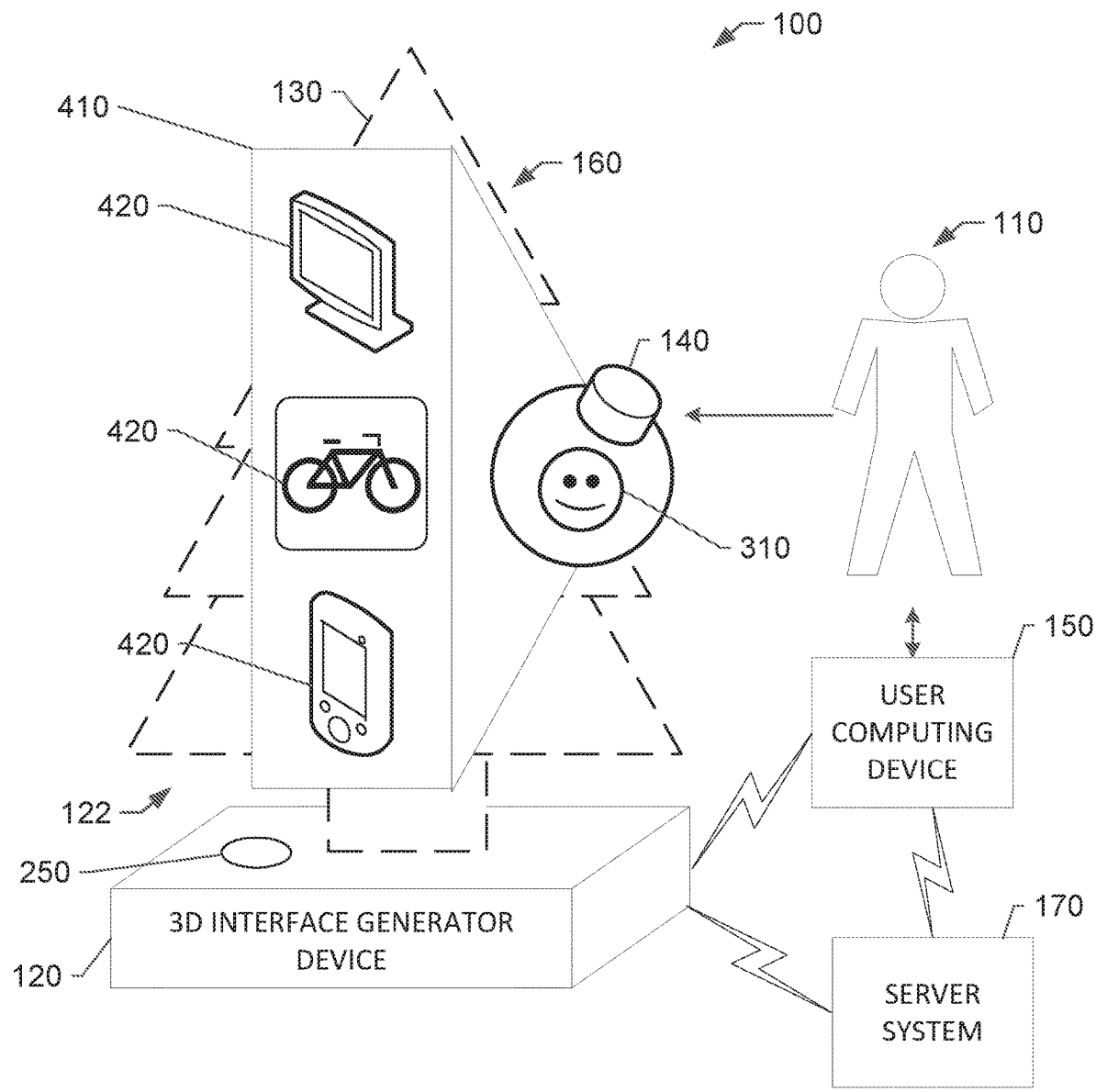
FIG. 4 is another schematic diagram of the example 3D user interface for the 3D image projection system shown in FIG. 3.

FIG. 4 illustrates an example activation of one of 3D elements 140 on 3D image 160 generated by 3D device 120. In the example embodiment, user 110 activates element 140 through a gesture and/or via user computing device 150. User 110 visually determines the identity of the person associated with identification information 310 by examining the overlaid identification information 310. In the example embodiment, user 110 selects a person as a designated recipient of a gift. Upon selection of a decoration 140, 3D device 120 generates a 3D gift list 410 which appears as a pop-up and/or dropdown menu list. In the example embodiment, gift list 410 is populated by icons of preferred gift items.

In the example embodiment, other users 110 register with system 100 to define the list of preferred gift items. At least one sensor on 3D device 120 may capture identification image. The at least one sensor 250 may include, for example, a camera. A photographic image and/or a video recording of each user 110, captured by a corresponding 3D device 120, may be stored in database 270 (shown in FIG. 2) and associated with the respective user 110. Each user 110 may also record audio greetings that may be played when the user is selected. Registration may include providing personal information such as name, address, and payment account information. Each user 110 may upload personal identifying information from a corresponding user computing device 150. In some embodiments, the camera may be used to scan text-based information presented by user 110 and stored in database 270.

The list of preferred gift items may be defined by each registered user 110. For example, upon registration, 3D device 120 displays a 3D list of possible items. User 110 selects from the predetermined list of possible items to determine a list of preferred items. User 110 may use various gestures to navigate the 3D user interface. For example, a swipe down may scroll a list down. Multi-point gestures involving multiple hands or fingers may also be used. For example, initiating a gesture with two points with close proximity and ending the gesture with the two points further apart in a widening gesture may invoke a specific response from 3D device 120 such as displaying additional options. In some embodiments, the 3D user interface may display the potential items in other formats. For example, potential items may also be represented by a category and selection of the category may expand the list into a tree. Additionally or alternatively, user 110 may have an account with a merchant. Projection system 100 may be configured to communicate with third-party merchants to retrieve a list preferred items stored with the merchant. Additionally or alternatively, user 110 may use user computing device 150 to upload a predetermined list of preferred gift items to 3D device 120.

In the example embodiment, user 110 selects a gift for another person by interacting with an icon 420 in gift list 410. Icon 420 represents a preferred gift for a designated recipient represented by identification information 310 on element 140. In some embodiments, icon 420 may be an animated 3D image, a 3D image, or a text or symbolic identifier. In the example embodiment, activation of one icon 420 automatically transmits a request for a purchase transaction for the associated gift item. The request may include gift information, account information, and gift recipient information. In some embodiments, the request may be transmitted to a merchant. In other embodiments, the request may be transmitted to a payment processor via a payment processing network. In alternative embodiments, activation of an icon 420 causes 3D device 120 to transmit a purchase request visually such as, for example, by displaying a code such as a QR code. User 110 may use user computing device 150 to scan the code. User computing device 150 may then automatically execute a purchase transaction based on the scanned code. In yet other embodiments, the request may be transmitted to user computing device 150 as a push notification for execution of a purchase transaction via user computing device 150. In some embodiments the request may include account information associated with user 110. In other embodiments, account information may be retained by a third party such as, for example, merchant 520, or payment processor 510.

Figure 5:
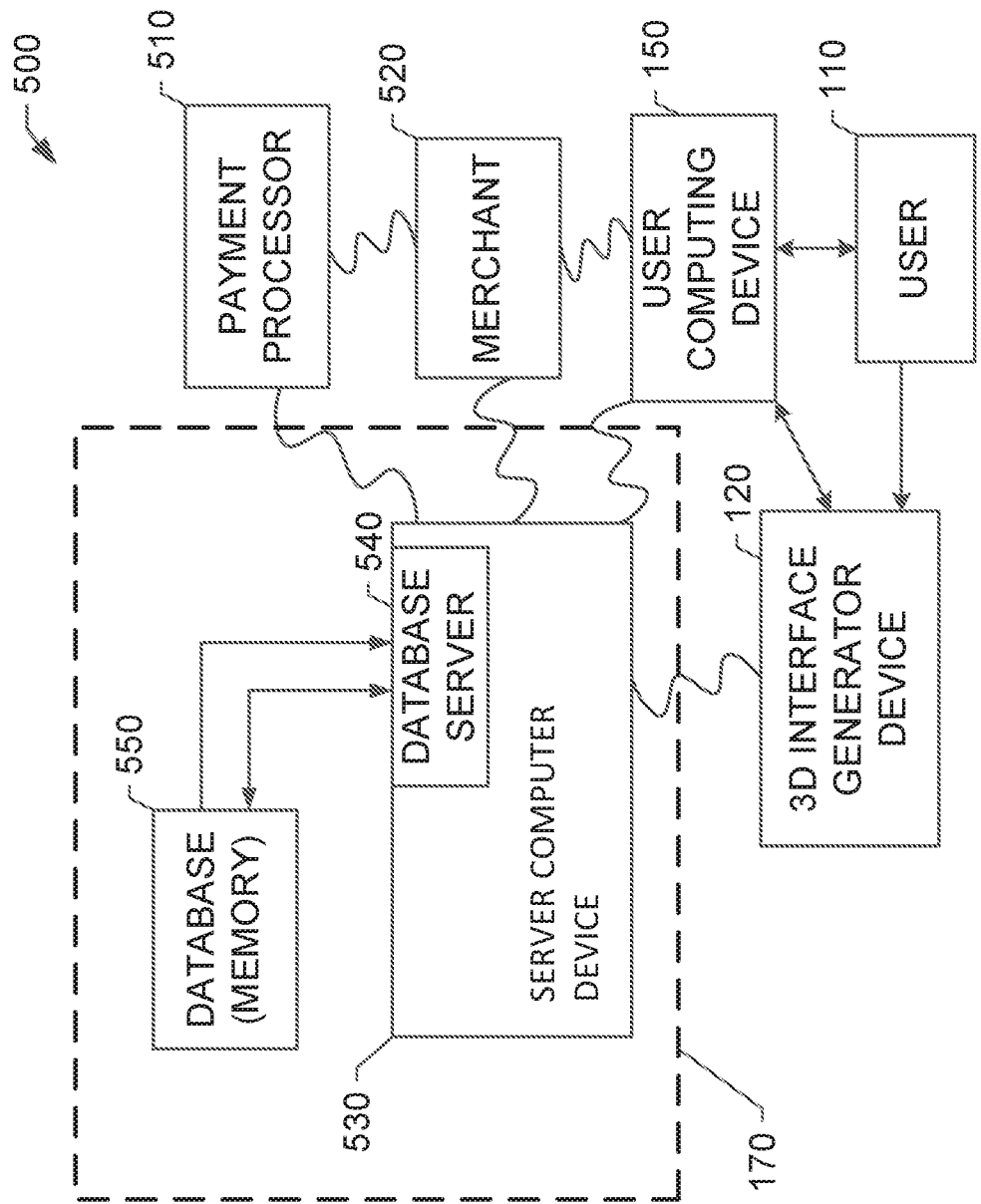
FIG. 5 is a simplified block diagram of an example server configuration of the 3D image projection system shown in FIG. 1.

FIG. 5 is a simplified block diagram of an example server configuration of server system 170 that may be used with projection system 100 shown in FIG. 1 in an example environment 500. In the example embodiment, 3D device 120 is communicatively coupled to a server computer device 530 of server system 170. Server computer device 530 may include a database server 540 in remote communication with a database 550. In some embodiments, server computer device 530 locally includes database 550. In the example embodiment, server computer device 530 is in communication with a payment processor 510. Server computer device 530 receives purchased gift selection from 3D device 120, receives user 110 information from 3D device 120, and/or retrieves user 110 account information from database 550, and transmits to payment processor 510 transaction data for purchase transactions engaged in by user 110. Alternatively, server computer device 530 receives user 110 account information from user computing device 150. Payment processor 510 then communicates with a merchant 520 to complete the gift purchase transaction.

Server computer device 530 may also be in direct communication with merchant 520. Merchant 520 may, for example, provide account information for registered users. In some embodiments, merchant 520 may upload and store gift data in database 550. In some embodiments, merchant 520 may access database 550 to retrieve transaction data.

In the example embodiment, server computer device 530 is also in direct communication with user computing device 150. User 110 may use user computing device 150 to provide registration information. Additionally or alternatively, user 110 interacts with 3D device 120 to access database 550. For example, user 110 may wish to add additional preferred gift items associated with the user's account. Using the 3D natural user interface generated by 3D device 120, user 110 may select preferred gift items from a list of gifts presented as described above.

Figure 6:
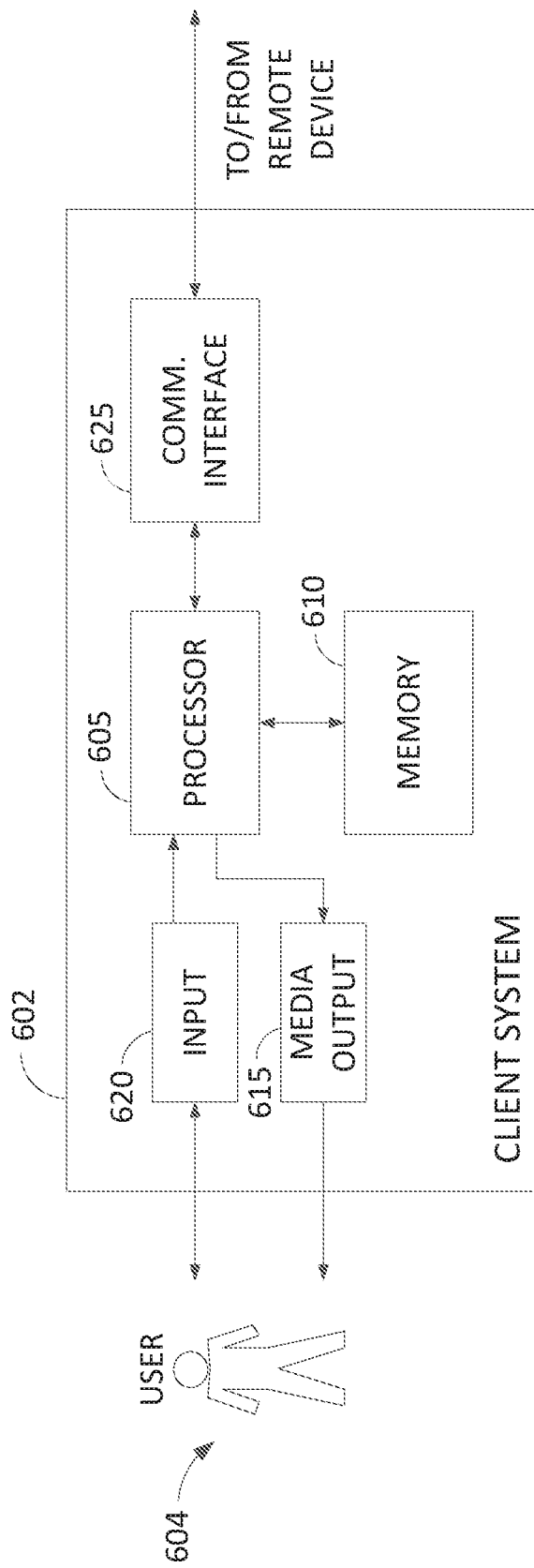
FIG. 6 is a simplified block diagram of an example user computing device that may be used with the system shown in FIG. 1.

FIG. 6 illustrates an example configuration of a client system 602 that may be used to implement user computing device 150 (shown in FIG. 1) in accordance with one embodiment of the present disclosure. Client system 602 may also be used to implement a merchant computing device, a POS system, or another user computing device in communication with 3D device 120 (shown in FIG. 1). Client system 602 is operated by a user 604 that may be, for example, user 110 or merchant 520 (shown in FIG. 5). Client system 602 includes a processor 605 for executing instructions. In some embodiments, executable instructions are stored in a memory area 610. Processor 605 includes one or more processing units (e.g., in a multi-core configuration). Memory area 610 is any device allowing information such as executable instructions and/or transaction data to be stored and retrieved. Memory area 610 may include one or more computer-readable media.

Client system 602 also includes at least one media output component 615 for presenting information to user 604. Media output component 615 is any component capable of conveying information to user 604. In some embodiments, media output component 615 includes an output adapter (not shown) such as a video adapter and/or an audio adapter. An output adapter is operatively coupled to processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 615 is configured to present a graphical user interface (e.g., a web browser and/or a client application) to user 604. A graphical user interface includes, for example, an online store interface for viewing and/or purchasing items, and/or a wallet application for managing payment information. In some embodiments, client system 602 includes an input device 620 for receiving input from user 604. User 604 may use input device 620 to, without limitation, select and/or enter one or more items to purchase and/or a purchase request, or to access credential information, and/or payment information. Input device 620 includes, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen functions as both an output device of media output component 615 and input device 620.

Client system 602 also includes a communication interface 625, communicatively coupled to a remote device such as 3D device 120. Communication interface 625 includes, for example, a wired or wireless network adapter and/or a wireless data transceiver for use with a mobile telecommunications network.

Stored in memory area 610 are, for example, computer-readable instructions for providing a user interface to user 604 via media output component 615 and, optionally, receiving and processing input from input device 620. The user interface includes, among other possibilities, a web browser and/or a client application capable of generating a user interface transmitted by, for example, 3D device 120. A client application allows user 604 to interact with, for example, 3D device 120. For example, instructions may be stored by a cloud service and the output of the execution of the instructions sent to the media output component 615.

Figure 7:
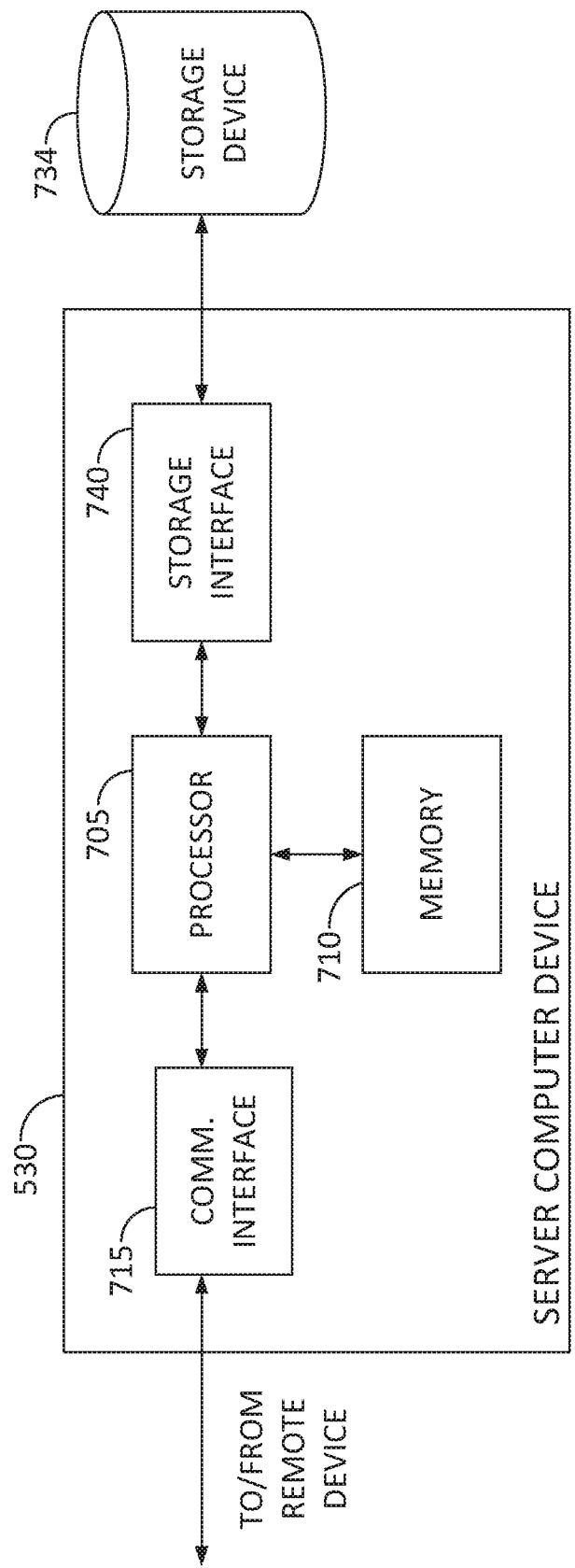
FIG. 7 is a simplified block diagram of an example server system that may be used with the system shown in FIG. 5.

FIG. 7 illustrates an example configuration of a server computing device 530 (shown in FIG. 5), in accordance with one embodiment of the present disclosure. Server computer device 530 includes a processor 705 for executing instructions. Instructions may be stored in a memory area 710.

Processor 705 may include one or more processing units (e.g., in a multi-core configuration).

Processor 705 is operatively coupled to a communication interface 715 such that server computer device 530 is capable of communicating with a remote device such as another server computer device 530, user computing device 150, merchant 520, or 3D device 120. For example, communication interface 715 receives requests from user computing device 150 via the Internet.

Processor 705 may also be operatively coupled to a storage device 734. Storage device 734 is any computer-operated hardware suitable for storing and/or retrieving data, such as, but not limited to, data associated with database 550. In some embodiments, storage device 734 is integrated in server computer device 530. For example, server computer device 530 may include one or more hard disk drives as storage device 734. In other embodiments, storage device 734 is external to server computer device 530 and may be accessed by a plurality of server computer devices 530. For example, storage device 734 may include a storage area network (SAN), a network attached storage (NAS) system, and/or multiple storage units such as hard disks and/or solid state disks in a redundant array of inexpensive disks (RAID) configuration.

In some embodiments, processor 705 is operatively coupled to storage device 734 via storage interface 740. For example, storage interface 740 is used to implement database server 540 (shown in FIG. 5). Storage interface 740 is any component capable of providing processor 705 with access to storage device 734. Storage interface 740 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 734.

Processor 705 executes computer-executable instructions for implementing aspects of the disclosure. In some embodiments, processor 705 is transformed into a special purpose microprocessor by executing computer-executable instructions or by otherwise being programmed. For example, processor 705 is programmed with the instructions such as those illustrated in FIG. 8.

Figure 8:
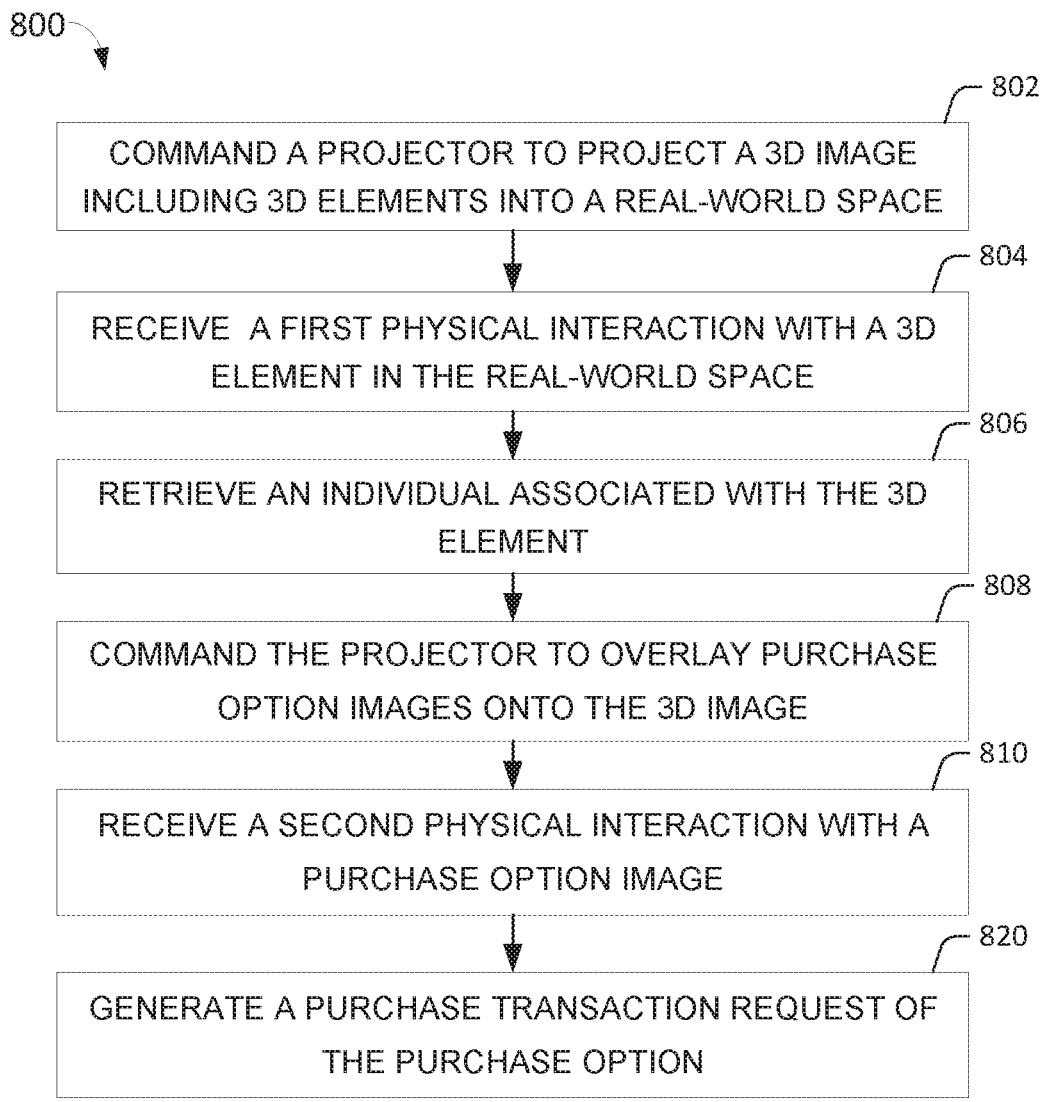
FIG. 8 illustrates a flow chart of an example process for user interaction with the 3D interface generator device shown in FIG. 1.

FIG. 8 illustrates a flow chart of an example method 800 of generating a 3D user interface and generating a request for a purchase transaction based on user input. In the example embodiment, method 800 is implemented by a 3D interface generator device 120 including at least one sensor 250, 3D image projector 210, memory device 230, and the at least one processor 220 coupled to memory device 230, projector 210, and the at least one sensor 250 (see FIG. 2). The memory device is configured to store (i) 3D image data corresponding to a 3D image where the 3D image includes a plurality of 3D elements, (ii) identification information for a plurality of individuals, where each of the plurality of individuals is associated with a respective one of the 3D elements, and (iii) sets of list data, each set of list data associated with a respective one of the plurality of individuals and identifying a plurality of purchase options.

In the example embodiment, method 800 includes commanding 802 the projector to project the 3D image into a real-world space. Method 800 also includes receiving 804 from the at least one sensor, an indication of a first physical interaction by a user with a first of the 3D elements in the real-world space. Method 800 also includes retrieving 806, from the memory device in response to the first physical interaction, a first of the individuals associated with the first 3D element, and a first of the sets of list data associated with the first individual. Method 800 also includes commanding 808 the projector to overlay a plurality of purchase option images onto the 3D image in the real-world space, each of the purchase option images representing a respective one of the purchase options in the first set of list data. Method 800 also includes receiving 810, from the at least one sensor, an indication of a second physical interaction by the user with one of the purchase option images in the real-world space. Method 800 further includes generating 820, in response to the second physical interaction, a purchase transaction request by the user of the one of the purchase options. Method 800 may also include additional or alternative steps based on the functionality of system 100 as described above.

Figure 9:
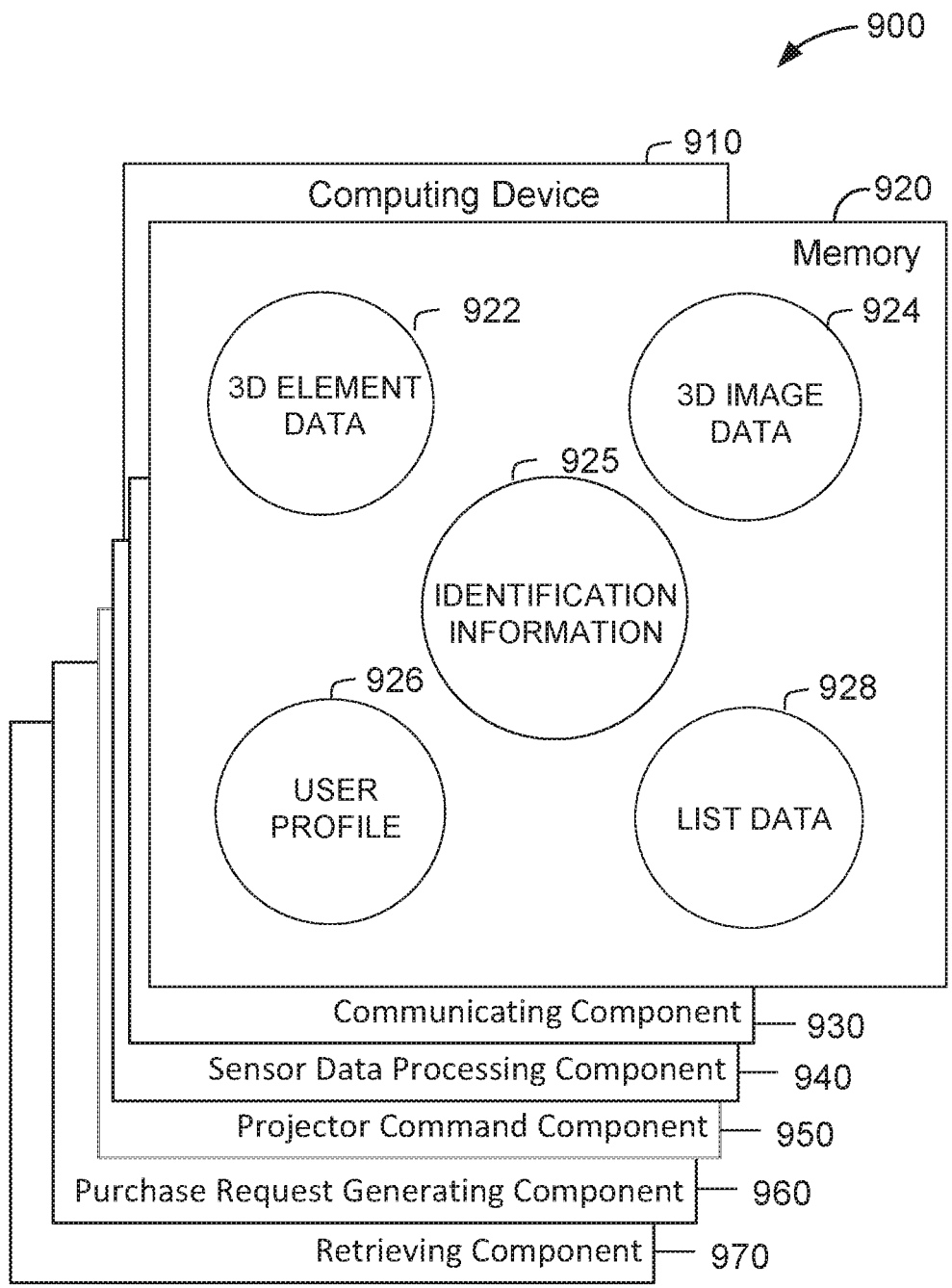
FIG. 9 is a diagram of components of one or more example computer devices that are used in the computing system shown in FIG. 1.

FIG. 9 depicts a diagram 900 of components of one or more example computing devices 910 that may be used to implement a 3D image projection system such as projection system 100 (shown in FIG. 1). In some embodiments, computing device 910 may be used to implement 3D device 120 (shown in FIG. 1). A memory component 920 is coupled with several separate components within computing device 910 which perform specific tasks. In the example embodiment, memory 920 includes 3D image data 924 for displaying a 3D image 160. 3D image data 924 may also include calendar data for associating certain images with a particular calendar date. Memory 920 may also include 3D element data 922 associated with images of additional 3D elements (e.g., ornaments). Memory 920 also may include identification information 925 for a plurality of individuals, including associating each individual with one of the 3D elements. For example, 3D element data 922 may include images, videos, and audio associated with gift recipients. Memory 920 may also include a user profile 926 associated with users that may use projection system 100 to select and initiate purchase transactions. Memory 920 may also include sets of list data 928 such as lists of purchase options for the individuals and/or data related to the purchase options such as pricing and the like.

Computing device 910 also includes communicating component 930 for transmitting purchase requests to, for example, merchant 520, and/or receiving data from, for example, a user computing device such as user computing device 150. Computing device 910 may also include a sensor data processing component 940 for processing data received from the at least one sensor 250 (shown in FIG. 2). For example, sensor data processing component 940 may analyze gesture data received from the at least one sensor 250 and compare the gesture data with stored gestures that correspond to function calls and/or commands for interacting with projection system 100 as part of user interface module 290 (shown in FIG. 2). Computing device 910 may also include a projector command component 950 for transmitting commands to 3D image projector 210 based on, for example, user gestures. Computing device 910 may also include a purchase request generating component 960 for generating purchase requests. Computing device 910 may also include a retrieving component 970 for retrieving, for example, identification information 925, user profile data 926, and/or list data 928 from memory 920.

Although various elements of the computer system are described herein as including general processing and memory devices, it should be understood that the computer system is a specialized computer configured to perform the steps described herein for facilitating purchase transactions for items via interaction with a projected three-dimensional display.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A 3D interface generator computing device comprising:
   at least one sensor;
   a projector;
   a memory device configured to store (i) 3D image data corresponding to a 3D image, wherein the 3D image includes a plurality of 3D elements, (ii) a plurality of user profiles each including identification information for a respective one of a plurality of individuals, wherein each of the plurality of user profiles is associated with a respective one of the 3D elements, (iii) sets of list data, each set of list data associated with a respective one of the plurality of individuals and identifying a plurality of purchase options; and (iv) a library of gestures indicating a pattern of physical interactions performed by a user; and
   at least one processor communicatively coupled to the memory device, the projector, and the at least one sensor, the at least one processor configured to:
      collect registration data from the plurality of individuals, wherein the registration data for each of the individuals defines gift items that the respective individual wishes to receive;
      generate the sets of list data for the plurality of user profiles based on the gift items in the registration data collected from the plurality of individuals;
      store the generated sets of list data in the memory device in association with the user profiles for the plurality of individuals;
      command the projector to project the 3D image into a real-world space;
      detect, using the at least one sensor, a physical interaction by the user in the real-world space;
      compare, in response to the detection, a location of the physical interaction with respect to the 3D image data to determine that the location is within a threshold distance of a first of the 3D elements within the 3D image, the first of the 3D elements associated with a first user profile of the plurality of user profiles;
      perform a lookup in the library of gestures stored in the memory device in response to the detection to determine, based on the determination that the location of the physical interaction is within the threshold distance of the first of the 3D elements, that the physical interaction corresponds to a selection of the first of the 3D elements;
      retrieve, from the memory device in response to the selection of the first of the 3D elements, a first of the sets of list data associated with the first user profile corresponding to the first of the 3D elements;
      command, in response to the selection of the first of the 3D elements, the projector to overlay a plurality of purchase option images onto the 3D image in the real-world space, each of the purchase option images representing a respective one of the purchase options in the first set of list data;
      receive, from the at least one sensor, an indication of a second physical interaction by the user with one of the purchase option images in the real-world space; and
      generate, in response to the second physical interaction, a purchase transaction request by the user for a gift item defined in the registration data of the first individual, the gift item associated with the one of the purchase options.

2. The computing device of claim 1, wherein the at least one processor is configured to generate the purchase transaction request by commanding the projector to project a QR code associated with the one of the purchase options.

3. The computing device of claim 1, wherein the at least one processor is configured to generate the purchase transaction request by transmitting a push notification for the one of the purchase options to a user computing device and causing the user computing device to execute a payment transaction for the one of the purchase options.

4. The computing device of claim 1, wherein the at least one processor is configured to generate the purchase transaction request includes transmitting account information and the one of the purchase options to a merchant.

5. The computing device of claim 1, wherein the at least one processor is further configured to identify the user based on input from the at least one sensor.

6. The computing device of claim 1, wherein the at least one processor is further configured to retrieve, from a merchant, account information associated with the user.

7. The computing device of claim 1, wherein the 3D image data further includes a reference date associated with a calendar event, and the at least one processor is further configured to select the 3D image data by comparing the reference date to a current date.

8. A computer-implemented method, the method executed by a 3D interface generator computing device that includes:

at least one sensor;

a projector;

a memory device configured to store (i) 3D image data corresponding to a 3D image, wherein the 3D image includes a plurality of 3D elements, (ii) a plurality of user profiles each including identification information for a respective one of a plurality of individuals, wherein each of the plurality of user profiles is associated with a respective one of the 3D elements, and (iii) sets of list data, each set of list data associated with a respective one of the plurality of individuals and a respective one of the plurality of user profiles, each set of list data identifying a plurality of purchase options; and at least one processor communicatively coupled to the memory device, the projector, and the at least one sensor, the method comprising:

collecting registration data from the plurality of individuals, wherein the registration data for each of the individuals defines gift items that the respective individual wishes to receive;

generating the sets of list data for the plurality of user profiles based on the gift items in the registration data collected from the plurality of individuals;

storing the generated sets of list data in the memory device in association with the user profiles for the plurality of individuals;

commanding the projector to project the 3D image into a real-world space;

detecting, using the at least one sensor, a physical interaction by a user in the real-world space;

comparing, in response to the detection, a location of the physical interaction with respect to the 3D image data to determine that the location is within a threshold distance of a first of the 3D elements within the 3D image, the first of the 3D elements associated with a first user profile of the plurality of user profiles;

performing a lookup in the library of gestures stored in the memory device in response to the detection to determine, based on the determination that the location of the physical interaction is within the threshold distance of the first of the 3D elements, that the physical interaction corresponds to a selection of the first of the 3D elements;

retrieving, from the memory device in response to the selection of the first of the 3D elements, a first of the sets of list data associated with the first user profile corresponding to the first of the 3D elements;

commanding, in response to the selection of the first of the 3D elements, the projector to overlay a plurality of purchase option images onto the 3D image in the real-world space, each of the purchase option images representing a respective one of the purchase options in the first set of list data;

receiving, from the at least one sensor, an indication of a second physical interaction by the user with one of the purchase option images in the real-world space; and generating, in response to the second physical interaction, a purchase transaction request by the user for a gift item defined in the registration data of the first individual, the gift item associated with the one of the purchase options.

9. The computer-implemented method of claim 8, wherein generating the purchase transaction request comprises commanding the projector to project a QR code associated with the one of the purchase options.

10. The computer-implemented method of claim 8, wherein generating the purchase transaction request comprises transmitting a push notification for the one of the purchase options to a user computing device and causing the user computing device to execute a payment transaction for the one of the purchase options.

11. The computer-implemented method of claim 8, wherein generating the purchase transaction request comprises transmitting account information and the one of the purchase options to a merchant.

12. The computer-implemented method of claim 8, further comprising identifying the user based on input from the at least one sensor.

13. The computer-implemented method of claim 8, further comprising retrieving, from a merchant, account information associated with the user.

14. The computer-implemented method of claim 8, wherein the 3D image data further includes a reference date associated with a calendar event, said method further comprising selecting the 3D image data by comparing the reference date to a current date.

15. At least one non-transitory computer-readable storage medium having computer-executable instructions, wherein when executed by a 3D interface generator computing device including:

at least one sensor;

a projector;

a memory device configured to store (i) 3D image data corresponding to a 3D image, wherein the 3D image includes a plurality of 3D elements, (ii) a plurality of user profiles each including identification information for a respective one of a plurality of individuals, wherein each of the plurality of user profiles is associated with a respective one of the 3D elements, and (iii) sets of list data, each set of list data associated with a respective one of the plurality of individuals and identifying a plurality of purchase options; and at least one processor communicatively coupled to the memory device, the projector, and the at least one sensor, the computer-executable instructions cause the at least one processor to:

collect registration data from the plurality of individuals, wherein the registration data for each of the individuals defines gift items that the respective individual wishes to receive;

generate the sets of list data for the plurality of user profiles based on the gift items in the registration data collected from the plurality of individuals;

store the generated sets of list data in the memory device in association with the user profiles for the plurality of individuals;

command the projector to project the 3D image into a real-world space;

detect, using the at least one sensor, a physical interaction by a user in the real-world space;

compare, in response to the detection, a location of the physical interaction with respect to the 3D image data to determine that the location is within a threshold distance of a first of the 3D elements within the 3D image, the first of the 3D elements associated with a first user profile of the plurality of user profiles;

perform a lookup in the library of gestures stored in the memory device in response to the detection to determine, based on the determination that the location of the physical interaction is within the threshold distance of the first of the 3D elements, that the physical interaction corresponds to a selection of the first of the 3D elements;

retrieve, from the memory device in response to the selection of the first of the 3D elements, a first of the sets of list data associated with the first user profile corresponding to the first of the 3D elements;

command, in response to the selection of the first of the 3D elements, the projector to overlay a plurality of purchase option images onto the 3D image in the real-world space, each of the purchase option images representing a respective one of the purchase options in the first set of list data;

receive, from the at least one sensor, an indication of a second physical interaction by the user with one of the purchase option images in the real-world space; and generate, in response to the second physical interaction, a purchase transaction request by the user for a gift item defined in the registration data of the first individual, the gift item associated with the one of the purchase options.

16. The at least one non-transitory computer-readable storage medium of claim 15, wherein the instructions further cause the at least one processor to generate the purchase transaction request by commanding the projector to project a QR code associated with the one of the purchase options.

17. The at least one non-transitory computer-readable storage medium of claim 15, wherein the instructions further cause the at least one processor to generate the purchase transaction request by transmitting a push notification for the one of the purchase options to a user computing device and causing the user computing device to execute a payment transaction for the one of the purchase options.

18. The at least one non-transitory computer-readable storage medium of claim 15, wherein the instructions further cause the at least one processor to generate the purchase transaction request by transmitting account information and the one of the purchase options to a merchant.

19. The at least one non-transitory computer-readable storage medium of claim 15, wherein the instructions further cause the at least one processor to identify the user based on input from the at least one sensor.

20. The at least one non-transitory computer-readable storage medium of claim 15, wherein the instructions further cause the at least one processor to retrieve, from a merchant, account information associated with the user.

* * * * *